United States Patent [19]
Rangarajan et al.

[11] Patent Number: 5,706,365
[45] Date of Patent: Jan. 6, 1998

[54] SYSTEM AND METHOD FOR PORTABLE DOCUMENT INDEXING USING N-GRAM WORD DECOMPOSITION

[75] Inventors: Vijayakumar Rangarajan, San Jose, Calif.; Natarajan Ravichandran, Bangalore, India

[73] Assignee: Rebus Technology, Inc., Sunnyvale, Calif.

[21] Appl. No.: 419,126

[22] Filed: Apr. 10, 1995

[51] Int. Cl.$^6$ ........................................... G06K 9/72
[52] U.S. Cl. ........................................ 382/230; 364/419.19
[58] Field of Search ................................. 382/224, 229, 382/230; 364/419.13, 419.19; 395/600

[56] References Cited

U.S. PATENT DOCUMENTS

| | | | |
|---|---|---|---|
| 4,495,566 | 1/1985 | Dickinson et al. | 395/600 |
| 5,062,142 | 10/1991 | Meckley | 382/27 |
| 5,062,143 | 10/1991 | Schmitt | 382/230 |
| 5,265,065 | 11/1993 | Turtle | 395/600 |
| 5,375,235 | 12/1994 | Berry et al. | 395/600 |
| 5,412,807 | 5/1995 | Moreland | 395/600 |
| 5,418,951 | 5/1995 | Damashek | 395/600 |
| 5,469,354 | 11/1995 | Hatakeyama et al. | 364/419.19 |

OTHER PUBLICATIONS

Kimbrell, Searching for Text? Send an N–Gram!, May 1988 pp. 297–312.

Meltzer, Arnold C. and Kowalski, Gerald, "Text Searching Using An Inversion Database Consisting Of Trigrams", The Second International Conference on Computers and Applications, Beijing, People's Republic of China, Jun. 23–27, 1987.

Kimbrell, Roy E., "Searching for Text? Send an N–Gram!", Byte, pp. 297–312. May, 1988.

Guarin, Clauda Jimenez, "Access By Content Of Documents In An Office Information System", 11th International Conference on Research & Development in Information Retrieval, Grenoble, France, Jun. 13–15, 1988.

*Primary Examiner*—Joseph Mancuso
*Assistant Examiner*—Timothy M. Johnson
*Attorney, Agent, or Firm*—Fenwick & West LLP

[57] ABSTRACT

A system and method provides for indexing and retrieval of stored documents using a decomposition of words in the documents in n-grams, or linear word subunits. The documents are indexed as pages in a number of banks. For each bank there is a bank index. The individual n-grams are identified for each page are stored in the bank index. Each bank index further contains an entry map that indicates whether a given n-gram is present in any of the pages of the bank, and then provides an index to a page map that further indicates which page in the bank contains the n-gram. When a search query is input, the query words are decomposed into their n-grams. The query word n-grams are compared first with entry maps to determine if the query word n-grams appear on any page in the bank. If so, the associated page map is traversed to determine which page in the bank contains the query word n-grams. The n-grams on the page are compared with the query word n-grams to determine the presence of an match therebetween. Matching pages are flagged. When all pages in all banks have been processed, the pages are consolidated with respect to the documents to which they belong, resulting in a list of documents that match the search query. The results are displayed to a user.

15 Claims, 15 Drawing Sheets

SYSTEM AND METHOD FOR PORTABLE DOCUMENT INDEXING USING N-GRAM WORD DECOMPOSITION

BACKGROUND

FIELD OF THE INVENTION

This invention relates to the field of document processing with optical scanners and optical character recognition, and more particularly, to systems and methods that index words in a document for subsequent search and retrieval.

BACKGROUND OF THE INVENTION

Optical character recognition (OCR) is widely used to capture printed or handwritten documents in a computer readable form, thereby allowing the documents to be subsequently searched and retrieved using information retrieval systems. Typical information retrieval systems with full text retrieval capability index every significant word in a document input into the system, providing for each word in the index a list of identifiers of where the word occurs, typically by document, page, and some type of word offset, or other similar type of linkage. Documents are retrieved in response to an input search query by exactly matching the words in the search query to words in the index and retrieving the documents indexed to the words. Boolean search operators are typically provided to enable complex search queries.

Accordingly, accurate retrieval of input documents relies primarily on accurate input and OCR analysis. OCR systems are generally very sensitive to spacing differentials between characters, font type, font size, page layout, image resolution, and image quality. Thus, even highly accurate OCR systems, with accuracy rates of about 99%, will misinterpret one character in every hundred, resulting in letter substitutions, missing letters, or similar spelling errors. As a result a typical OCR processed document may then have anywhere from 3 to 8 or more misspellings or errors per page. This does not include the typographical errors that may be originally present in the document. Another problem is that the OCR system will run separate words together.

A misspelled word will not be properly indexed, and hence will not be retrieved during in response to a search query including the properly spelled word. Likewise, individual words in a run together word string will not be indexed at all, but only indexed as part of the entire word string, and hence a document containing any of the individual words in the word string will not be retrieved in response to a search query specifying such words.

Typical solutions to the misspelling problems rely on thesauruses or similar devices to index common misspellings to their correctly spelled sources. One problem with this approach is that it does not account for uncommon misspellings. These approaches also significantly increase the size of the index, and this leads to another aspect of information retrieval system design.

A second major issue in information retrieval systems is the performance and time required to create and maintain an index. Typically, an inverted index is maintained as a single monolith data structure, such as a doubly linked list, or tree structure. Each time a new document is added to the system, which may be daily for on-line databases, the entire index must be adjusted, and each word entry in the index that appears in the input documents must be updated with the relevant data for the input documents. This makes on-line indexing unsuitable for large systems, so that indexing is performed off-line, limiting how quickly one can search the added documents. In addition, the more detailed the index, the more time consuming the indexing process. However, a detailed index may provide the benefit of reduced search times. Thus, there is a tradeoff between indexing time and search time.

Finally, another concern with information systems is the ability to exchange indexed documents for use with adjunct or client systems. Currently, many software applications, and particularly databases and information systems, are client-server based. In addition, there is an ever increasing number of portable computers. These factors make it desirable to provide an indexing system that allows indexed documents to be efficiently added or removed from the system for searching without substantial overhead for re-indexing. Conventional information retrieval systems employ a monolithic inverted index that is not portable, because the index may be many megabytes, or even gigabytes, and index tens of thousands of pages of documents. An index of this size or complexity cannot be conveniently transferred to remote clients, portable computing devices, or removable storage media.

Accordingly, it is desirable to provide an indexing system that compensates for errors in the input document, whether from OCR analysis or otherwise, and allows fast indexing and accurate retrieval of documents that contained misspellings or other typographical errors. It is further desirable to provide a system that allows for rapid indexing without a significant increase in search times, and further supports portability of indexed documents.

SUMMARY OF THE INVENTION

An improved indexing and retrieval method and system overcomes the limitations of existing information retrieval systems by decomposing each word into a number of "n-grams" or word subunits. An n-gram is a ordered linear combination of n characters as they appear in a given word, particularly letters or numbers, such as "cho", "thi", "ment". Generally, an n-gram has an n-gram parameter $N_p$ which is the number of characters in the n-gram. An n-gram with an n-gram parameter $N_p$ of three is conveniently called a "trigram." For example, the word "houseboat" is composed of the trigrams "hou", "ous", "use", "seb", "ebo", "boa", "oat". Note that neither "tbh" or "hbt" is a trigram of "houseboat" even though all of the letters are present in the word because the order and relation of the letters as they appear in the word is significant.

In the present invention, the non-stop words on each page of a document are decomposed into their n-grams, which are indexed and stored. By indexing words by n-grams, rather than complete words, misspellings, partial words, or words embedded in word strings can be identified by searching for matches between n-grams of query words and n-grams in the documents, rather than matches between entire words. For example, assume the word "factory" is misspelled in a document as "factori". Its n-grams are stored as "fac", "act", "cto", "tor", and "ori". These are compared with the n-grams of the search query word "factory" correctly spelled: "fac", "act", "cto", "tor", "ory". Four of five n-grams will match, and the document will be retrieved. Similarly, if the first letter was left off due to OCR analysis problems, the n-grams would still be "act", "cto", "for", and "ory". Here, four of the five n-grams still match, so the word will be retrieved. Clearly, n-grams for words inside a run together word string would be similarly identifiable and separately matchable.

Accordingly, for searching and retrieving documents, a search query is input, and the words in the search query are likewise decomposed into their n-grams. The query word n-grams are then compared with the n-grams for words on the pages of various documents. Where any query word n-grams match any word n-grams on a page, the page is retrieved, and the query word n-grams are further compared with each word n-gram. This allows a determination of the preciseness of the match between the query words and the words on the page. The document containing the page can then be retrieved and displayed to the user. Boolean searching can also be performed once a determination of match between query words and document words has been made.

The foregoing describes the basic idea of the n-gram decomposition and indexing process. Many different systems may be devised to use the n-grams to analyze words or documents. It is desirable however to employ n-gram decomposition in a system that provides for efficient indexing and fast searching with high accuracy, and that further provides for portability of is indices and documents. Accordingly, a separate and further aspect of the invention is the use of a hierarchical indexing scheme that stores the data representing documents in a number of drawers, each drawer containing documents with pages of text and image data. The pages are listed in a number of banks in a drawer. N-gram decomposition and indexing is performed on discrete pages, rather than on entire documents.

Each drawer contains a number of banks. For each bank there is a bank index. The bank index stores data representing the n-grams that actually appear on each page in the associated bank. Since there is a known fixed number of n-grams of a given size, each bank index further includes an entry map that indicates for each possible n-gram whether there are any instances of the n-grams on any of the pages listed in the bank. For each n-gram of which there are instances on any pages in the bank, then the entry map provides access to a further page map that specifically identifies each page in the bank that includes the n-gram. This type of storage structure allows for a very compact, efficient use of memory during indexing and retrieval.

The banks and bank indices provide a rapid retrieval system. When a query is entered, the n-grams of the query words are determined. Each n-gram in the query words is first compared just against the entry map to determine if there are any instances of the n-grams in any pages of the bank. Where the entry map indicates that some page contains the n-grams, the page maps are traversed to determine specifically which pages need further processing. This initial preprocessing very quickly identifies only those pages that need further searching for a given query word, eliminating from consideration pages that do not contain any n-grams of the query words.

A second processing stage then will access only those pages in the bank that contain portions of the query. For each such page, the n-grams on the page, which are stored in the bank index, are then compared with the query word n-grams. When a sufficient percentage of these match the n-grams of a query word, the document associated with the page is indicated for retrieval.

This organization of documents and indices provides for portability of the documents since an entire drawer, including its drawers, documents, banks, and bank indices, can be transferred from the computer system where the document was indexed, to another computer system, and searched thereon without the need to re-index the documents in the drawer.

DETAILED DESCRIPTION OF THE INVENTION

System Architecture

Figure 1:
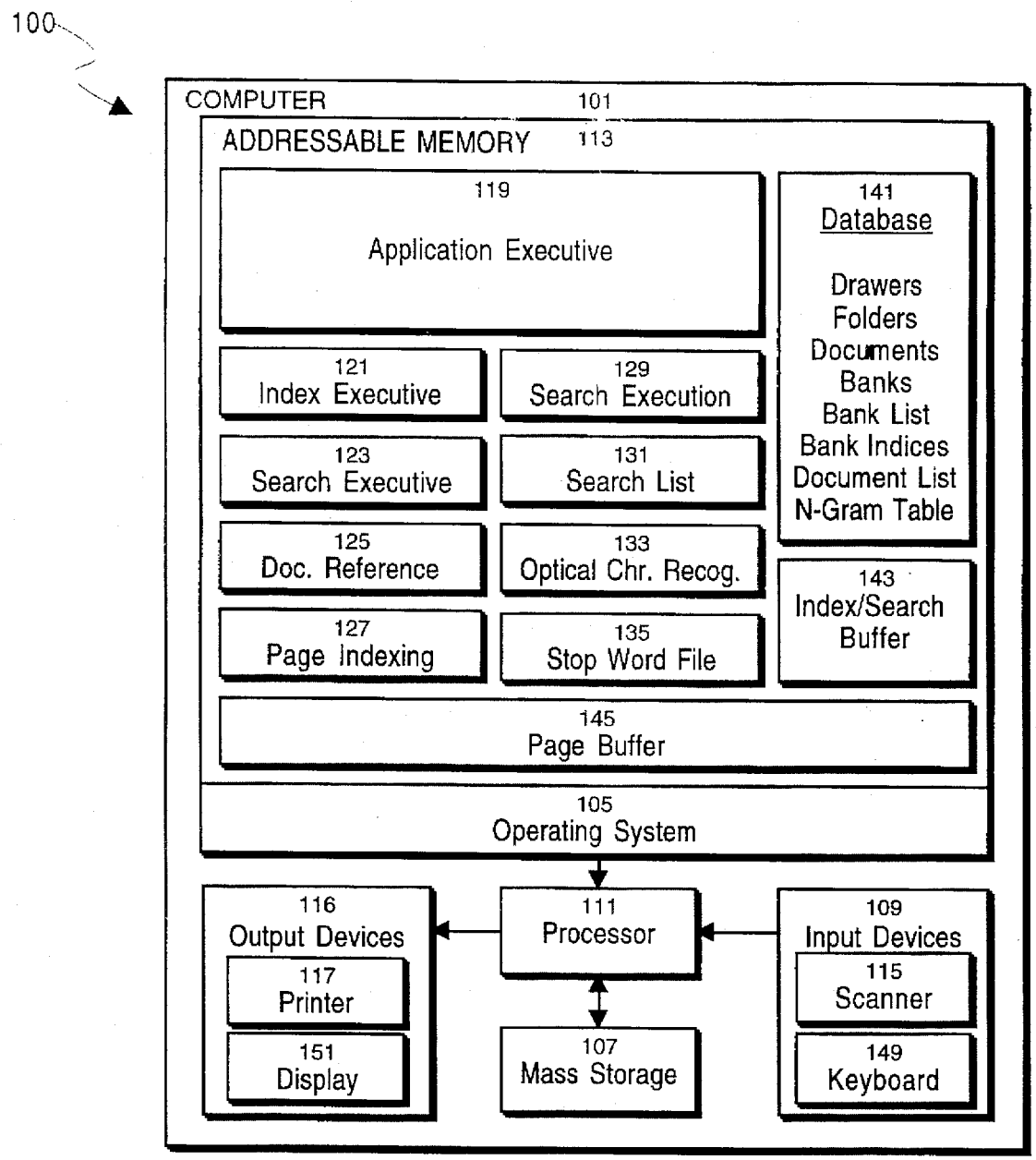
FIG. 1 is a block diagram of a system for indexing and retrieving documents using n-gram decomposition.

Referring now to FIG. 1, there is shown a system for using the improved document indexing and retrieval system of the present invention. The system 100 includes a computer 101 having a secondary storage 107 for long term storage of scanned documents, an input device 109 and an output device 116 for receiving and outputting commands and data, and an addressable memory 113 for storing the various code modules for execution by a processor 111.

The input devices 109 include a scanner 115 that is capable of scanning input documents, and producing either gray scale, bitonal, or color bitmap files for the input documents. The scanner 115 preferably has at least 200 dpi resolution. The input devices 109 further include a keyboard 149 for entering commands and data. The output devices 116 include a printer 117 for printing documents, including scanned documents, or other documents resident in the system 100. The output devices 116 also include a display 151 for displaying a user interface for the system to the user, along with search results and other information.

The addressable memory 113 includes a number of code modules that together comprise an executable application that manages the system 100 of the present invention. More particularly, the addressable memory 113 includes an application executive 119, an index executive 121, a search executive 123, a document reference module 125, a page indexing module 127, a search execution module 129, a search list module 131, and a optical character recognition module 133. The operation of these various modules will be described below, following a description of the storage elements that support portable document indexing. An index/search buffer 143 is used to temporarily store data generated during the indexing and searching stages. A page buffer 145 is used to temporarily store data from documents during searching. A stop word file 135 maintains a list of words that are excluded from indexing. The stop word file 135 is provided with the system 100, and may be modified by the user.

The system 100 is accessed through the application executive 119 which provides a suitable user interface on the display 151, allowing the user to input documents into the system 100 through the scanner 115, or other source, such as existing text files, image files, graphic files, and the like, to input search queries containing combinations of word, universal characters, and Boolean or SQL operators, and to review the results of search queries on the output devices, such as the display 151 or printer 117.

Figure 2A:
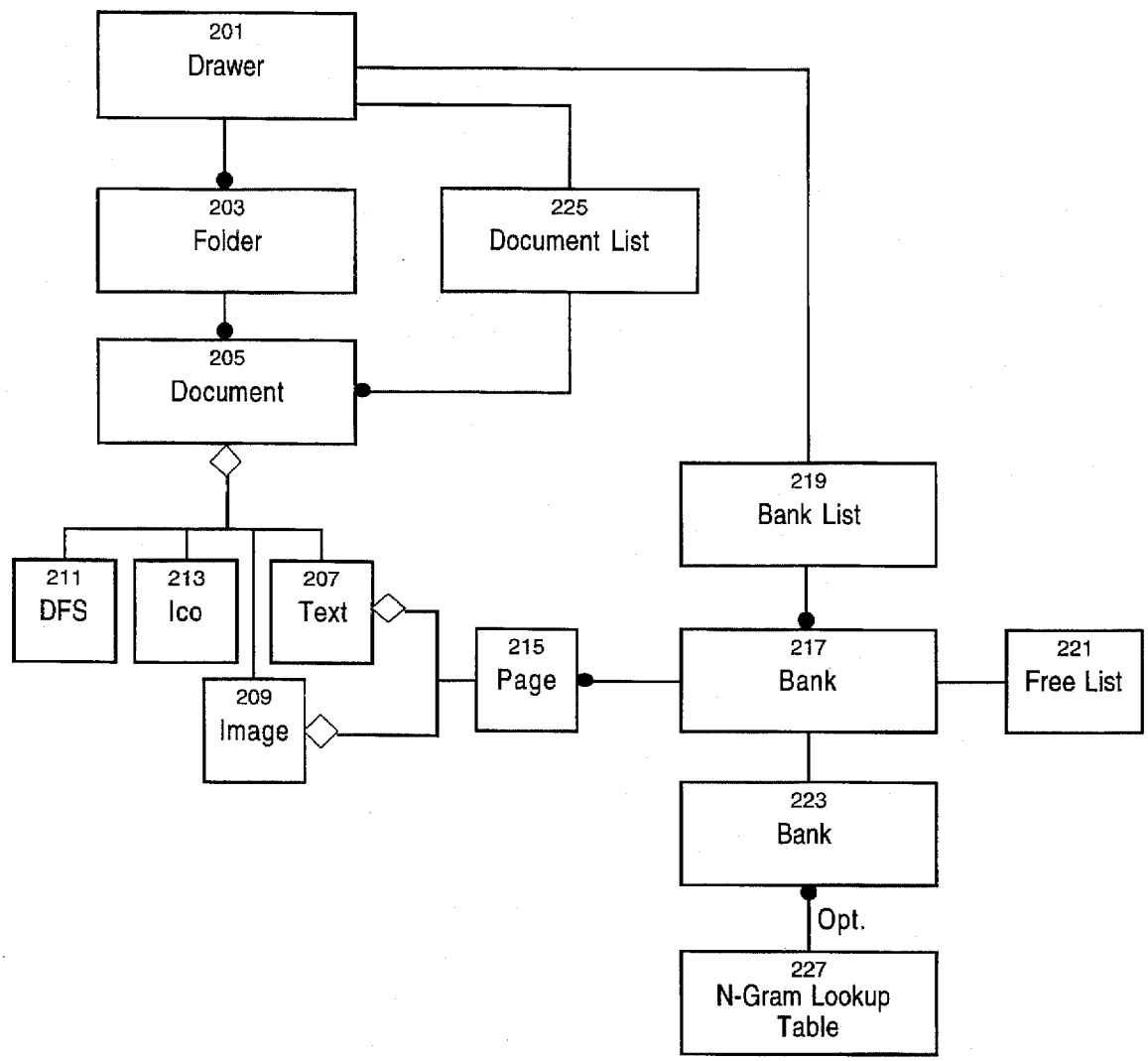
FIG. 2a is an object model of the storage elements of the system, showing the associations of drawer, folders, documents, banks, bank list, bank index, free list, and document list.
Figure 2B:
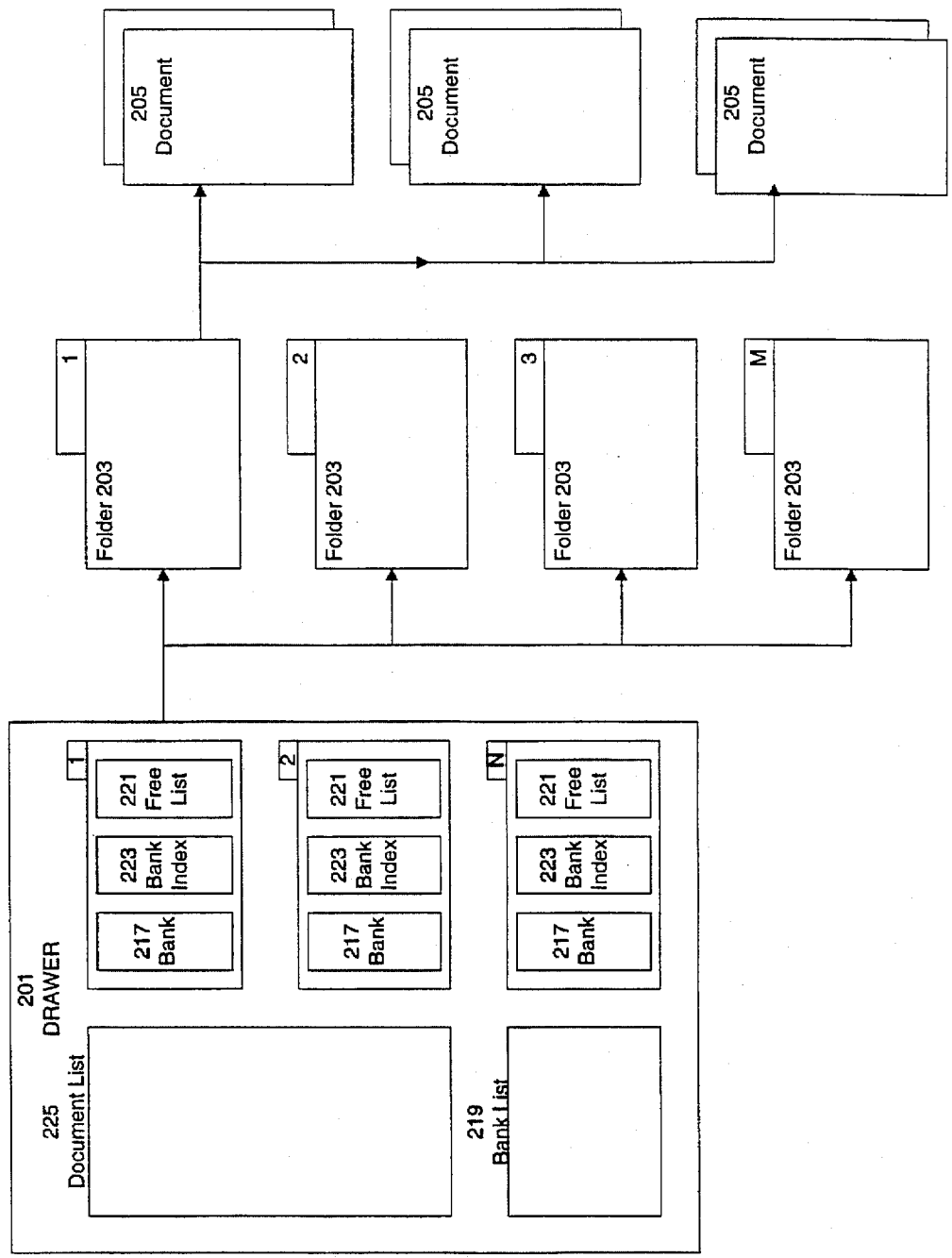
FIG. 2b is an illustration of the user's perspective of these storage elements.

The addressable memory 113 further includes a database 141 of storage structures useful for implementing the n-gram decomposition indexing of the present invention. Referring now to FIG. 2a, there is shown an object model of these storage structures in the addressable memory 113. FIG. 2b illustrates the user's perspective of these storage structures.

The addressable memory 113 includes one or more drawers 201. Each drawer 201 preferably has a drawer name, and a logical name, and media type, whether removeable or fixed media. This last attribute allows drawers 201 to be transferred to various computing devices on portable storage media.

Each drawer 201 further includes a hierarchical list of zero or more folders 203. Each folder 203 has a folder name and includes zero or more documents 205 or other folders 203.

Each document 205 preferably has a document name, for recognition by the user, and a unique document number used by the system 100. A document 205 is comprised of at least a text file 207. Additionally a document 205 may include an image file 209, an icon file 213, and a document file structure (DFS) file 211. The text file 207 contains the text data of the document in an ASCII or similar format. The text data will generally be produced from OCR processing on the image data. The text data may also be directly created from user inputs. The text data may also be entered, for example, where the document 205 is a bitmapped or vector graphics file, and the user wishes to include a comment or description of the file for indexing purposes. The text 207 file contains its data in one or more pages 215. Each page is identified by its page number, document name, folder name, and drawer name.

The image file 209 is a bitonal, grayscale, or color bitmap resulting from a scanning and digitization of a corresponding input document, or other similar processing. The data in the image file 209 is similarly stored in pages 215.

The DFS file 211 maps the text file data to the image file data. The DFS file 211 contains for every line of text in the text file 207 a mapping to a image page 215, and a bounding rectangle defined by pixel coordinates (preferably upper-left and lower-right corners) of where the line of text appears in the image page 215. This mapping allows the user to access the text data on a page when viewing the image of the page. The DFS file 211 also preferably maintains a page count for the number of text and image pages in the document 205. The DFS file 211 further maintains reference data about each page 215 in the document 205, including a page number, document number and name, full path name, and icon file name.

The icon file 213 contains thumbnail bitmapped images of each page of the document 205. The thumbnail images are displayed to the user during search and retrieval operations or while the document 205 is being accessed by the user. In the preferred embodiment, where the document only contains text data produced without scanning or the like, then there is no accompanying image file 209 or icon file 213.

Figure 3:
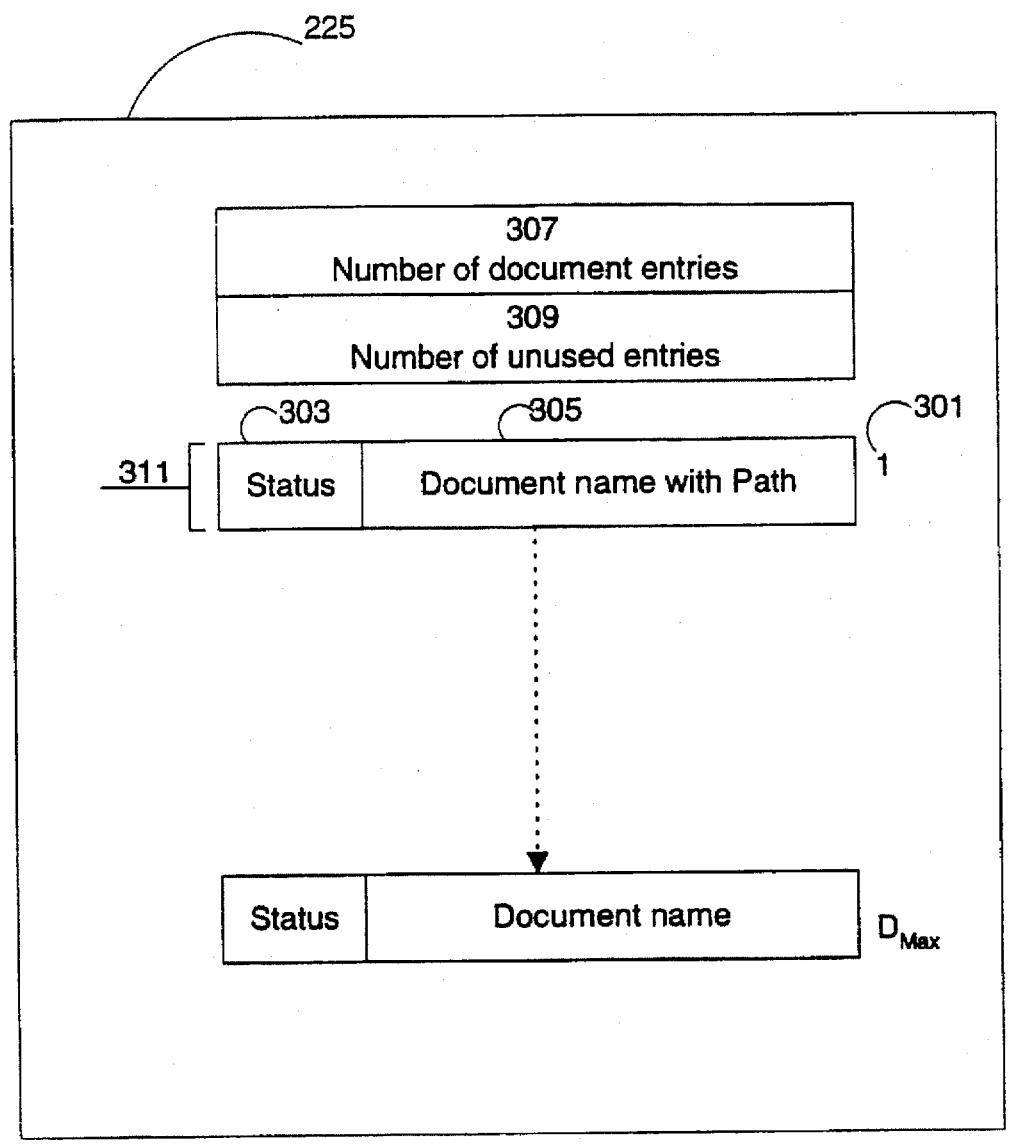
FIG. 3 is an illustration of the structure of the document list.

Each drawer 201 is associated with a document list 225. The document list is an index of all documents 205 in the drawer 201. FIG. 3 illustrates the structure of the document list 225. The document list 225 stores a variable number of entries 311, up to maximum limit $D_{max}$. In the preferred embodiment $D_{max}$ is limited by the number of overall pages in all of the documents in the drawer 201, with each drawer 201 capable of handling up to 1,044,480 pages. Each entry 311 includes the full path name of each document 205 in the drawer 201. Each document 205 has a unique document number 301 within the document list 225 as a result of its offset in the document list 225. A status value 303 is preferably maintained to indicate for each entry 311 whether it is available to store a document. The document list 225 maintains a count of the number 307 of document entries 311, and a count of the number 309 of unused entries, which are created when existing documents are removed.

Figure 4:
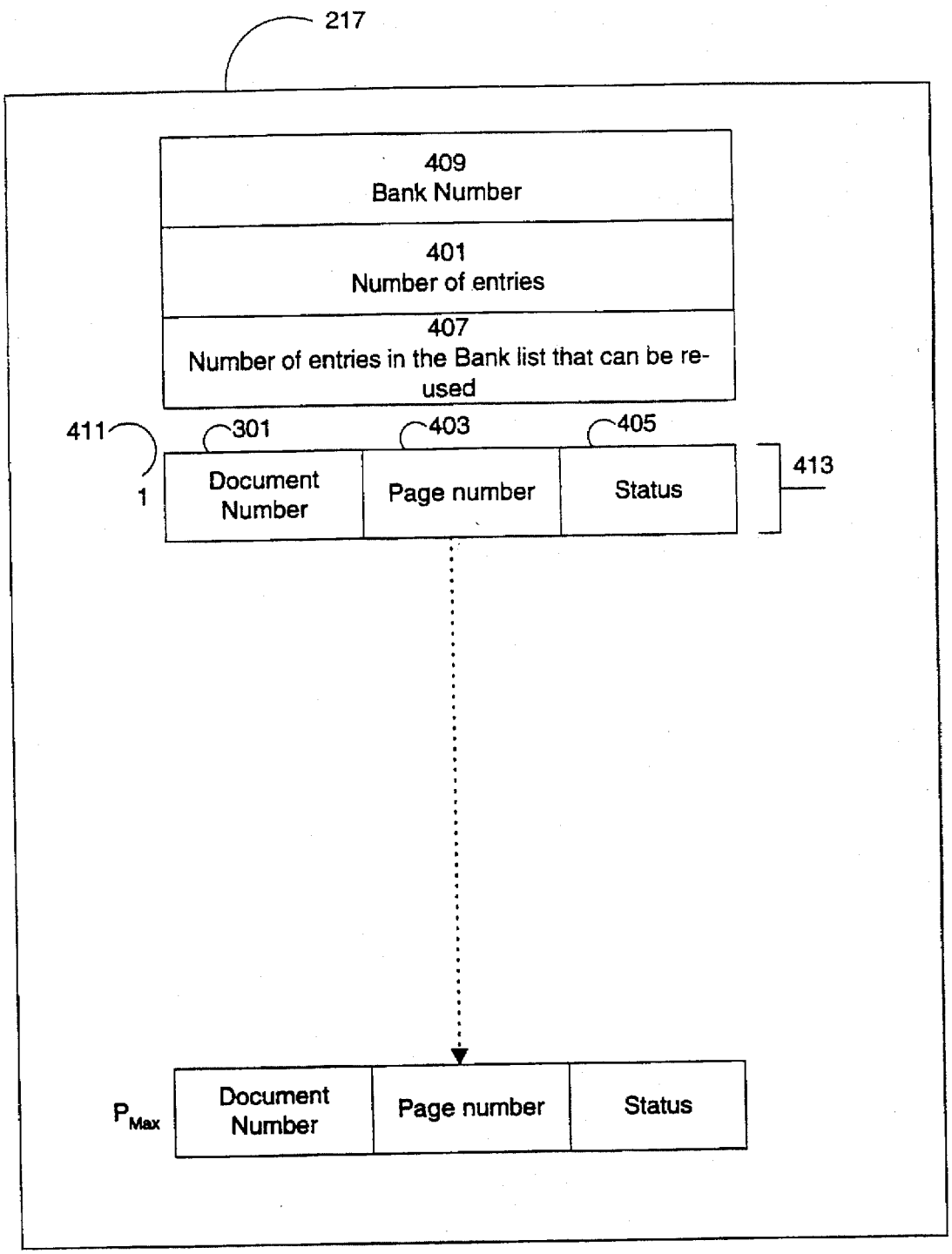
FIG. 4 is an illustration of the structure of a bank.

The system 100 further includes at least one bank 217. FIG. 4 is an illustration of the structure of a bank 217. Each bank 217 contains a list of pages from various documents in the system 100, up to a predetermined number $P_{max}$ of entries 413. In the preferred embodiment, a bank 217 contains up to 255 entries, or page references. In other embodiments, $P_{max}$ may be higher, resulting in indexing of more pages, or $P_{max}$ may be lower, for fewer indexible pages, but less storage requirements. The document pages are listed with their document number 301 from the document list 225 for the drawer 201, and then by a page number 403 within the document 205. For each entry 413, a status value 405 is preferably maintained indicating whether a page is referenced in the entry. Each entry 413 further has an associated bank offset 411 which is the offset of the entry 413 within the bank 217; the bank offset 411 is not actually stored in the entry 413. Each bank 217 preferably maintains a number 407 of unused entries, which is updated as new pages are referenced, and others are un-referenced in the bank 217. In the preferred embodiment, a drawer 201 may include 4096 banks 217, resulting in up to 1,044,480 pages of indexed data for each drawer 201. Each bank 217 has a bank number 409 that uniquely identifies it in the drawer 201 and bank list 219; the bank number 409 may be stored in the bank 217 itself, or may be can identified by the file name of the bank 217. Together, a bank number 409 and a bank offset 411 form a bank reference for a page.

Figure 5:
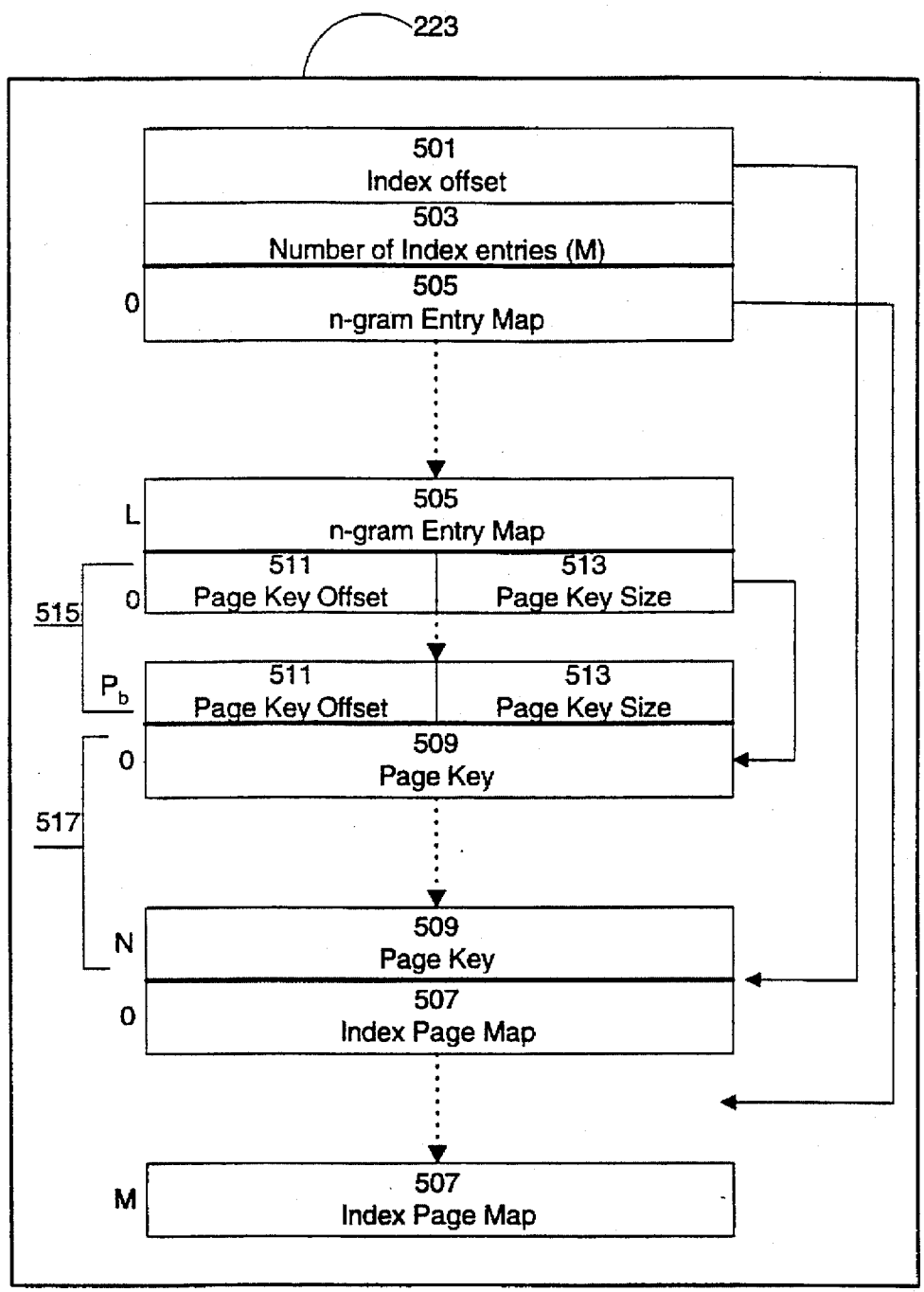
FIG. 5 is an illustration of the structure of a bank index.

Each bank 217 is associated with a bank index 223, and a free list 221. Each bank index 223 identifies the n-grams found in each page entry 413 in a bank 217. Referring to FIG. 5, there is shown the preferred structure of the bank index 223. In the preferred embodiment, the bank index 223 does not directly include a list of all n-grams, as data. Rather, each n-gram is assigned a unique number, which is used to index a fixed number of n-gram entry maps 505.

First, the character set and character range indexible by the system 100 for indexing is selected. The total number of indexible characters is called $C_{max}$. The total number L of n-grams then is:

$$L = [C_{max}]^{N_P}.$$

In the preferred embodiment, the indexible characters are "A"–"Z", "0"–"9". All punctuation and special characters, which are typically not used to search for data, are preferably mapped to a single character, such as "~". This allows indexing of words such as "AT&T" as "AT~T" and numbers, such as "3.1415926" as "3~1415926". In addition, where the last several characters of a word are insufficient in number for an n-gram by themselves, "~" may be used to complete the n-gram. For example, the trigram of "at" would be "at~". International characters may be mapped to corresponding English equivalents. Lowercase characters are converted to their uppercase value. This results in the preferred embodiment in 37 different characters for each position in the n-gram. In the preferred embodiment then, there are 50,563 ($37^3$) trigrams. The 37 characters are ordered in any useful manner, such as by their ASCII value, or other means. The possible n-grams are then listed and serially numbered with an n-gram number. For example, assuming numerals first, letters, and then "~", the ordering would be "000", "001", . . . "00A", . . . "00Z", "00~", . . . "~~~". In a preferred embodiment, the n-gram number may be calculated as follows:

$$\text{n-gram number} = (\text{1st n-gram letter no.}) * \text{max\_char}^{N-1} + \\ (\text{2nd n-gram letter no.}) * \text{max\_char}^{N-2} + \\ (\text{3nd n-gram letter no.}) * \text{max\_char}^{N-3} + \\ \ldots \\ (N-1^{th} \text{ n-gram letter no.}) * \text{max\_char} + \\ (N^{th} \text{ n-gram letter no.}).$$

where the n-gram letter number is the ordered number of the letter as it appears in the n-gram, N is the n-gram parameter $N_p$, and max\_char is equal to $C_{max}$. In the preferred embodiment the $C_{max}$ is 37, and the n-gram parameter $N_p$ is 3, so this equation reduces to:

$$\text{trigram number} = (\text{1st trigram letter no.}) * 37^2 + \\ (\text{2nd trigram letter no.}) * 37 + \\ (\text{3nd trigram letter no.}).$$

In an alternate embodiment, a lookup table 227 stores the n-grams, and the offset of a given n-gram in the table is its n-gram number.

Each bank index 223 includes a fixed number of n-gram entry maps 505 equal in number to the total number L of n-grams being used. Each n-gram entry map 505 maintains an index value to an index page map 507, if an index page map 507 has been allocated for the n-gram associated with the n-gram entry 505. Each index value unit represents the total number of elements in a index page map 507. An index offset 501 stores the address of the first index page map 507. The (index value −1) in an n-gram entry map 505 is added to the index offset 501 to reach the index page map 507 associated with the n-gram entry map 505. As many n-grams may not appear in any of the pages entries 413 in the bank 217, the n-gram entry maps 505 allow the system 100 to rapidly determine for which n-grams there are actual instances in the page, and hence actual index page maps 507 to be further analyzed during searching.

For each n-gram entry map 505 where the index value is non-zero, is there is an index page map 507. Each index page map 507 contains data indicating which pages 403 in the bank 217 contain the n-gram. The index page map 507 contains one bit for each possible page entry 413 in the bank 217. In the preferred embodiment, the number of bits in each map 507 corresponds to maximum number of entries $P_{max}$ in the bank 217. The bit position in the index page map 507 corresponds to the bank offset 411 of a page entry 413 in the bank 217. The bit is set if the page entry 413 contains the n-gram associated with the index page map 507, and unset if it does not. In the preferred embodiment with 255 pages entries 413 in a bank 217, each index page map 507 contains 32 bytes (256 bits) to map the n-grams to the pages entries 413. In other embodiments, other forms of mapping may be used, such as lists of pointers. The updating of the index page maps 507 is further described below.

Figure 6:
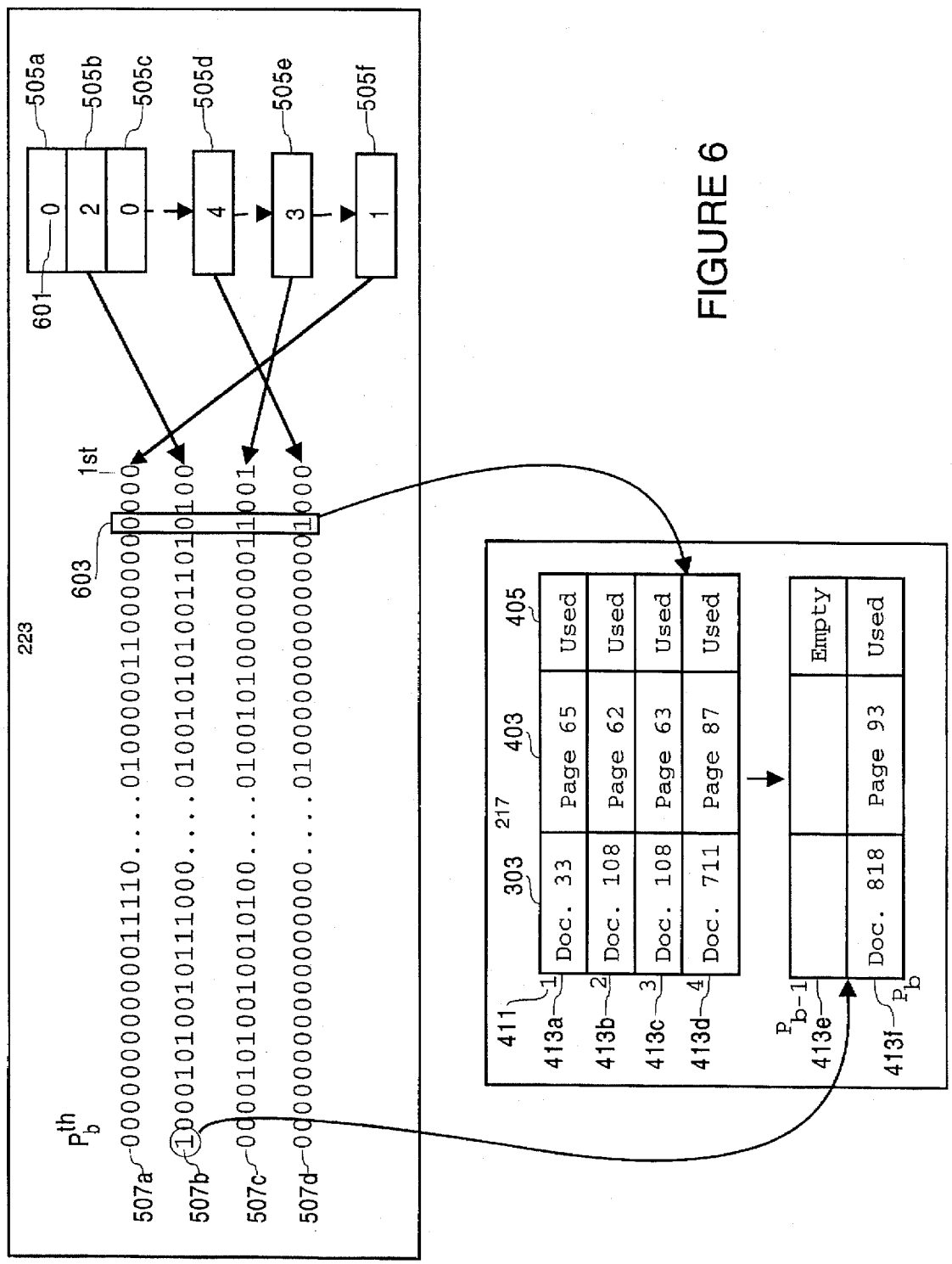
FIG. 6 is an illustration of one example of the relationship between a bank and a bank index.

FIG. 6 is an example of the indexing relationship between a bank 217 and a bank index 223. In FIG. 6 there is shown a portion of a bank 217 containing various page entries 413a–f, with total number of entries $P_b$. Several of entries are marked "used" in their status value 405, and each such entry 413 includes a document number 303, indicating which document it belongs to in the document list 225 (not shown), and a page number 403 indicating which page in the document. Notice that the entries 413 come from many different documents, and even entries from the same document, such as entries 413b,c, are only selected pages of the document. The bank offset 411 for each entry 413 is indicated.

The bank index 223 includes a portion of the complete listing of n-gram entry maps 505a–f. Each of these n-gram entry maps 505a–f includes an index value 601 that indicates which index page map 507a–f, if any, is allocated for the n-gram associated with the n-gram entry map. Thus, the first (as it appears on the illustration; it may be the $n^{th}$ one in the bank index 223) n-gram entry map 505a has a index value 601 equal to zero, indicating the n-gram associated with the map does not appear on any page in the bank 217, and thus no index page map 507 is allocated for the n-gram entry map 505. Likewise with the third n-gram entry map 505c.

The second n-gram entry map 505b however, has an index value equal to 2, indexing to the second index page map 507b. Thus, there is at least one page in the bank 217 that has an instance of the n-gram associated with the n-gram entry map 505b, whatever that n-gram maybe. Similarly, the fourth n-gram entry map 505d indexes to the fourth index page map 507d, n-gram entry map 505e indexes to the third index page map 507c, and n-gram entry map 505f indexes to the first index page map 507a.

Each index page map 507 includes a set of bits which map to the entries 413 in the bank 217. The value of an mth bit in an index page map 507 indicates whether the n-gram associated with the n-gram entry map 505 for that index page map 507 appears on the page represented by the $m^{th}$ entry 413. The first bit in each index entry map 507 maps to the first entry 413a, the second to the second entry 413b, and so on.

For example, in the box 603, there is shown the mappings for the fourth entry 413d in the bank 217. In both the first and second index page maps 505a,b the bit corresponding to entry 413d is unset. This indicates that the n-grams associated with n-gram entry maps 505b and 505f do not appear on page 87 of document number 711. However, the bits in index page maps 507c,d are set, so the n-grams associated with n-gram entry maps 505d,e do appear on that page. Similarly, the $(P_{max})^{th}$ bit of index page map 507b indicates that the n-gram associated with this map appears on page 93 of document number 818.

Referring again to FIG. 5, the bank index 223 further stores data representing the n-grams that appear in the pages that are identified by the page entries 413 in the bank 217. This is the area of the bank index 223 where actual searching is performed to locate documents that match an input query. This data is stored in a variable length table 517 of page keys 509, one for each page entry 413. A page key 509 is a variable length field of the following form:

$$[k_i, \text{n-gram } i_1, \text{n-gram } i_2, \ldots \text{n-gram } i_k]$$

$$[k_{(i+1)}, \text{n-gram } (i+1)_1, \text{n-gram } (i+1)_2 \ldots \text{n-gram } (i+1)_k]$$

where $k_i$ is the number of n-grams in the $i^{th}$ word on the page, and n-grams $i_{(1 \ldots k)}$ is the list of n-gram numbers in the $i^{th}$ word. Each group of values [k][n-gram 1, n-gram 2, ... n-gram k] is called a "word key." The set of word keys for the all words on a page is the page key 509. Note that the n-grams themselves are not stored in the preferred embodiment, but rather an n-gram number that uniquely identifies each n-gram in stored in the page key 509. Using n-gram numbers rather than the n-grams themselves results in a memory savings. Each n-gram requires 1 byte for each character, so a trigram is 3 bytes. But each n-gram number only requires:

$$\log_2([C_{max}]^{N_p})$$

bits. A trigam thus only requires 15.6 bit, or 2 bytes.

Assuming a maximum text data size of 32 k for a page, the maximum size of a page key 509 in the preferred embodiment is only 128 k. In practice, the average size of each page is about 2 k, and so each page key 509 is about 8 k.

In order to access to individual page keys 509 there is provided a fixed size page offset table 515. Each entry therein includes a page key offset 511 and page key size 513 for each page key 509. In the preferred embodiment, there is one entry for each of the pages entries 413 in the bank 217. The page key offset 511 is a offset to the start of the variable length page key 509 corresponding to the table entry. The page key size 513 is the total number of bytes in the corresponding page key 509, including all the entries for n-grams and k values. Maintaining the page key size 513 allows the system 100 to delete indexed pages from the system, and still have information as to the available area for adding and indexing a new page, thereby avoiding wasting storage space.

A free list 221 is associated with each bank 217, and stores information as to which pages entries 413 in the bank 217 are available for indexing, including where a previously indexed page entry 413 has been deleted. When a page entry 413 is deleted from a bank 217, the page key offset 511, and the page key size 513 in the bank index 223 is stored in the free list 221, and then the page key offset 511 is set to zero in the bank index 223.

A bank list 219 contains data for all of the banks 217 in a drawer 201. The bank list 219 maintains for each bank 217 a count of the number of free entries 413 in the bank 217. These values are updated as new pages are added to the banks 217, or old ones are deleted. In the preferred embodiment, the bank list 219 includes a free entry count for up to 4096 banks 217, according to their bank number. Table 1 illustrates the structure of the bank list 219:

TABLE 1

| Bank 1 | Bank 2 | Bank 3 | — | Bank 4096 |
| --- | --- | --- | --- | --- |
| Free Count | Free Count | Free Count | — | Free Count |

Referring again to the DFS file 211, in the preferred embodiment it contains for each page 215 of its associated document 205, the bank number of the bank 217 that contains the page 215, as ordered in the bank list 219, the bank offset 411 within the bank 217, the page number 403 of the document, and the document number 301 in the document list 225.

System Operation

I. Overall Process Flow

The system 100 provides an improved method for indexing and searching documents in an information storage and retrieval system. The method includes two basic processes: indexing a document, and searching for a document using a search query.

Figure 7:
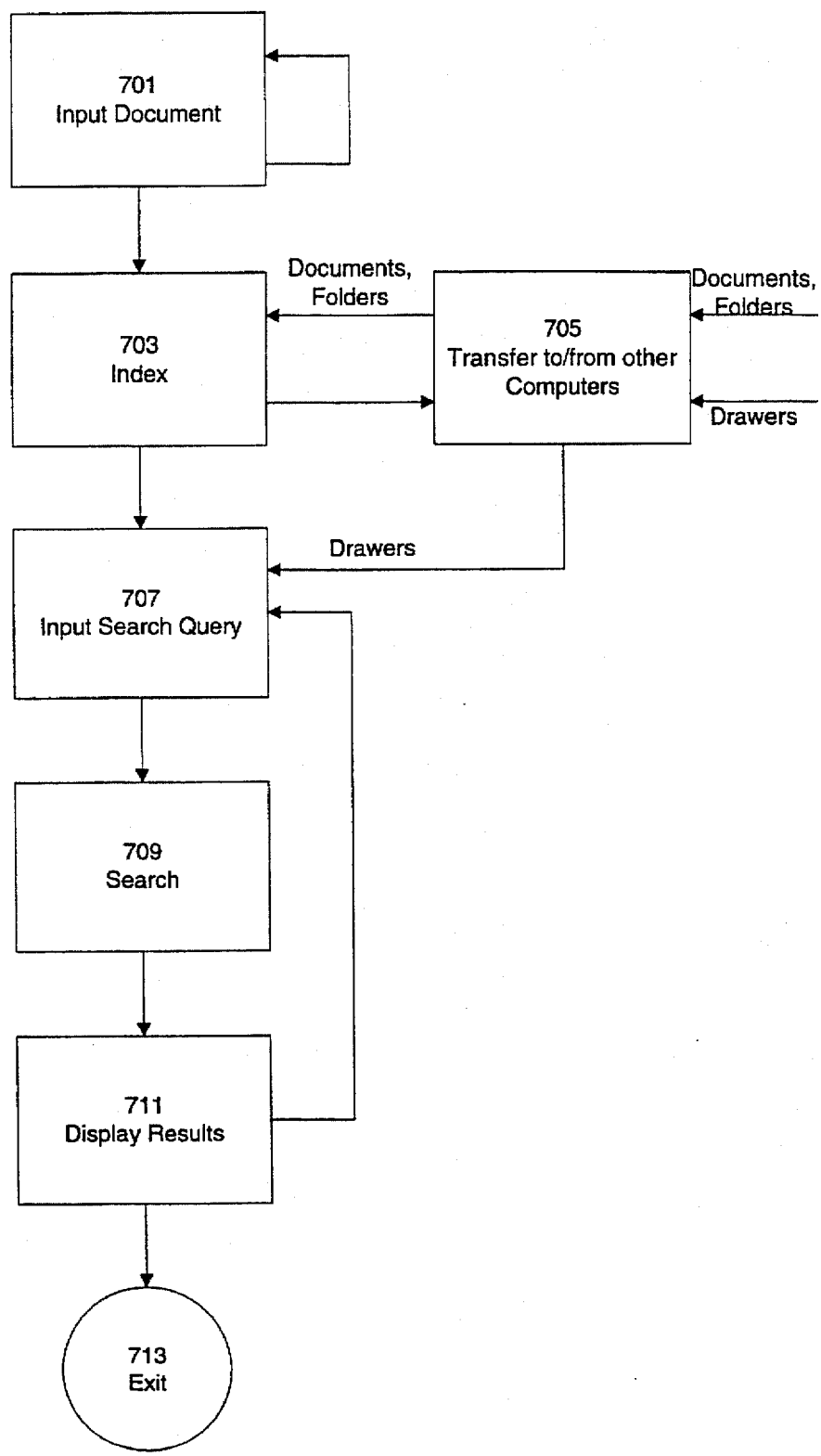
FIG. 7 is a flowgraph of the overall method of indexing and searching documents.

Referring now to FIG. 7, there is shown a flowgraph of the overall method of the present invention. A document, or set of documents, is input 701 into the system 100. For printed documents or images, the documents may be scanned in a conventional manner with the scanner, and then processed by the OCR module 133 to produce the text data of the text file 207. Or a document with an image file 209 may be imported from other systems, such as a facsimile image, and processed by the OCR module 133. Alternatively, the document may be input directly as text data in the text file 207, or the document may be an image, for which the user has provided additional text information in the text file 207. Where a document is received directly as text data, there is no mapping provided in the DFS file 211 between the text file 207 and the image file 209. Alternatively, where the text data is directly received it may be rendered into an image file using conventional imaging techniques, and then the DFS file 211 may be updated to include the text-image mapping information. The user is preferably prompted by the application executive 119 to select/create a drawer 201 and folder 203 in which to store the input document(s).

After obtaining the text data of an input document, the input document is then indexed 703. Indexing is managed by the index executive 121. Indexing is preferably done on a page by page basis if the document is being scanned during the input stage 701. It may also be done on a document by document basis, or in batch or deferred mode if desired, for conveniently handling large amounts of documents. Indexing identifies all of the n-grams in each page of the document, locates available space in one or more of the banks 217 of the user-selected drawer and folder, and updates the bank 217, bank index 223, bank list 219, and free list 221 accordingly.

Once indexing is complete, the user may decide to transfer 705 an entire drawer 201 of indexed documents 205 to another computer, either directly via a network connection, or a via a portable storage media. This would allow another computer to search on the documents 205 within the drawer 201 without having to re-index 703 the documents. Alternatively, the user may decide to transfer one or more documents 205 or folders 203. Re-indexing is only required when documents are transferred between drawers 201.

The system 100 is capable of searching on any indexed drawer 201. The application executive 119 prompts the user to select a drawer(s) 201, folder(s) 203, or document(s) 201 for searching 709. The user inputs 707 a search query, specifying the desired words and Boolean operators. The user also specifies a matching parameter E that describes the percentage of exactness between the search query and the words present in any document. In the preferred embodiment, E is limited to a useful range, such as (20%–100%).

With the input search query, the search executive 123 manages the search process 709. Briefly, searching involves converting the query words into n-grams, and then comparing these query word n-grams to the n-grams in the bank indices 223. Matching n-grams are then analyzed and weighted by the matching parameter to determine a degree of match. Document with matches that satisfy the search query and the matching parameter are retrieved and displayed 711 to the user. The user may conduct additional searches, store search results, print out the documents, copy portions of the documents into other application software for use therein, or conclude searching.

II. Document Indexing

Figure 8:
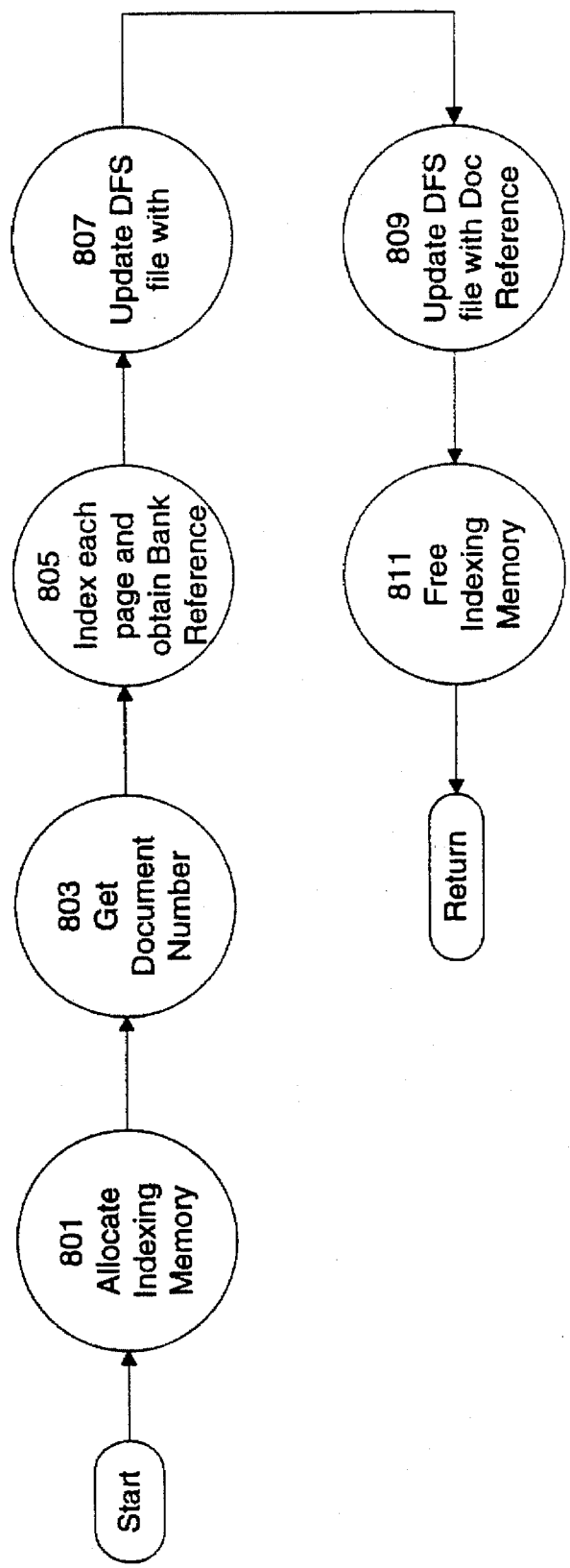
FIG. 8 is a flowgraph of the indexing process for a document.

Referring now to FIG. 8, there is shown a flowgraph of the process 703 of indexing a document into the system 100, as managed by the index executive 121. The index executive 121 performs a series of operations to index each n-gram in each page 215 of the document(s) 205 input by the user, and to update the appropriate bank 217, bank list 219, free list 221, and bank index 223.

The index executive 121 allocates 801 memory for the indexing process. This involves clearing the buffers 143, 145, and setting aside any other additional memory resources sufficient to allow indexing of a large number of pages.

The index executive 121 calls the document reference module 125 to obtain 803 a document number 301 for the document 205 being indexed. The index executive 121 provides the document reference module 125 with a root node of the drawer 201 containing the specified document 205, and a document name of the document 205, as provided by the user during the input stage 701. The document reference module 125 opens the document list 225 for the drawer 201, and determines from the number 309 of unused entries if there is space available for a new document within the existing list of entries 311. If not, then a new entry 311 is created at the end of the list of entries in the document list 225. The status value 303 is set, and the full path name 305 of the document is stored. If there is an unused entry 311 within the list, then the document reference module 125 scans the lists and locates the first entry 311 with an unset status value 303. The status value 303 is set and the full path name is stored. In either case, the document reference module 125 will return the document number 301 which is the offset of the updated/new entry 311 in the document list 225.

Figure 9:
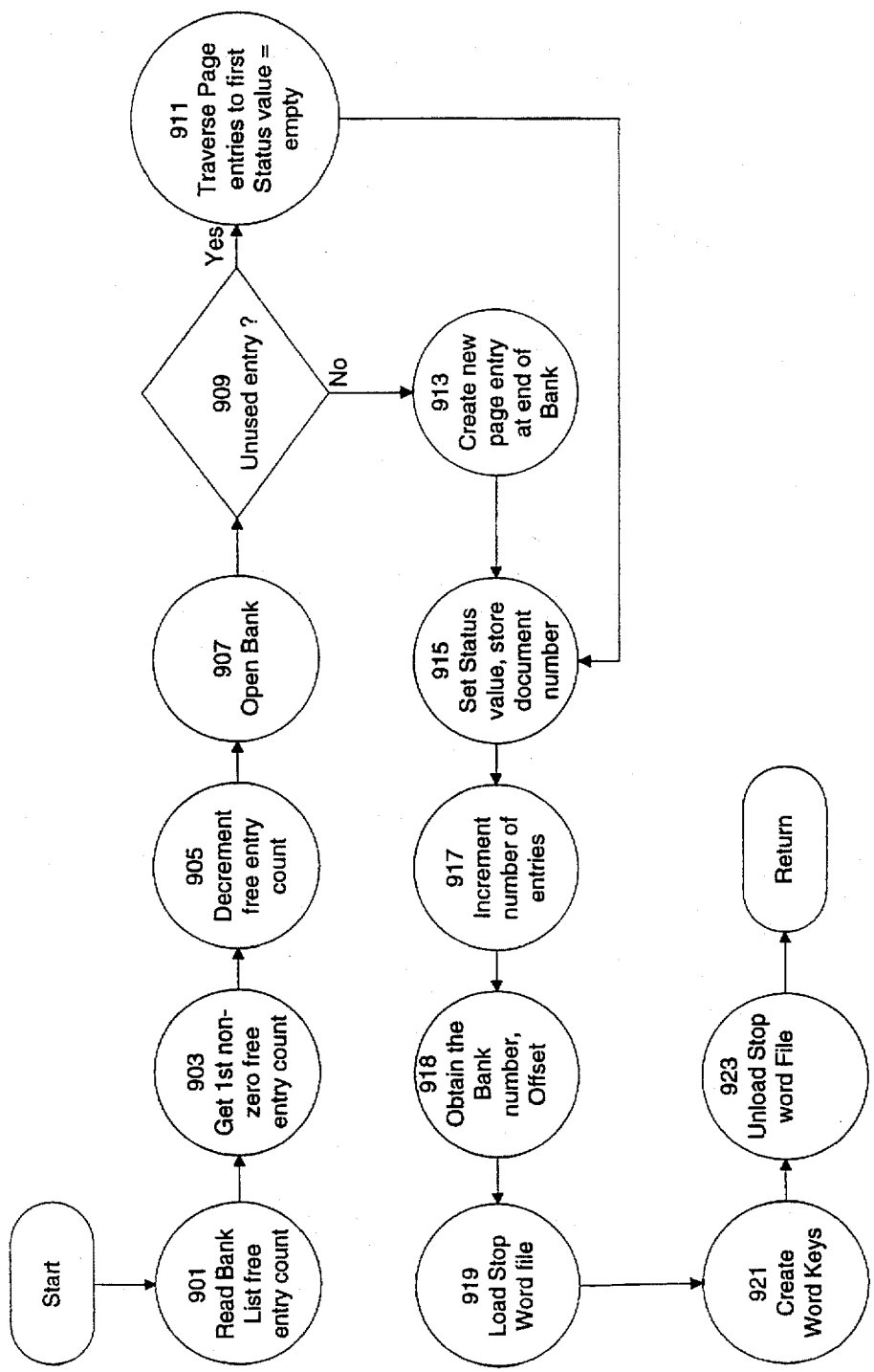
FIG. 9 is a flowgraph of the process of indexing a page in a document.

The index executive 121 then invokes the page indexing module 127 to index 805 each page of the document 205 and store the resulting data in a bank index 223. The page indexing module 127 performs the actual creation of the n-gram number for on each page of the document. Referring to FIG. 9, there is shown a flowgraph of the process of indexing a page. This process is repeated for each page of the document.

The page indexing module 127 first obtains a bank offset 411 for the page in some bank 217. This associates the page being indexed with a position in a particular bank 217 in the user selected drawer 201. It further allows each page of the document to be stored in a different bank 217. This is done as follows:

The page indexing module 127 reads 901 the bank list 219 and identifies the first bank 217 listed therein that is not full, by reading the free entry count for each bank 217 until a non-zero value is reached 903. The page indexing module 127 decrements 905 that free entry count and opens 907 the associated bank 217.

The page indexing module 127 checks 909 the number 407 of unused entries in the bank 217. Again, this value indicates where pages that have been previously indexed and included in the bank 217 have been removed. If this value is non-zero, then the page indexing module 127 traverses 911 the entries in the bank 217, and identifies the first entry with a status value 405 indicating an empty entry. If the number 407 of unused entries is zero, the page indexing module 127 then creates 913 a new entry at the end of the bank 217, using the number 401 of entries in the bank 217 to offset to the last entry.

In either case, the page indexing module 127 sets 915 that status value 405 to indicate a current entry, and stores the document number 301 from the document list 225 in the entry, and the page number 403 of the document. It then increments 917 the number 401 of entries in the bank 217, and obtains 918 the bank number of the bank 217, and the bank offset 411 within the bank 217.

The page indexing module 127 then loads 919 the stop word file 135, in order to filter out stop words from being included in generated word keys for the page. The page indexing module 127 then creates 921 the word keys for the page. The word keys will be stored in the page key 509 for the page in the bank index 223 associated with the bank 217 that contains the page. The word keys for the page key 509 are all created first, and then subsequently stored in the page key 509 since the page key size 513 is determined for the page key 509 prior to actual storage. The word keys are created as follows.

Figure 10:
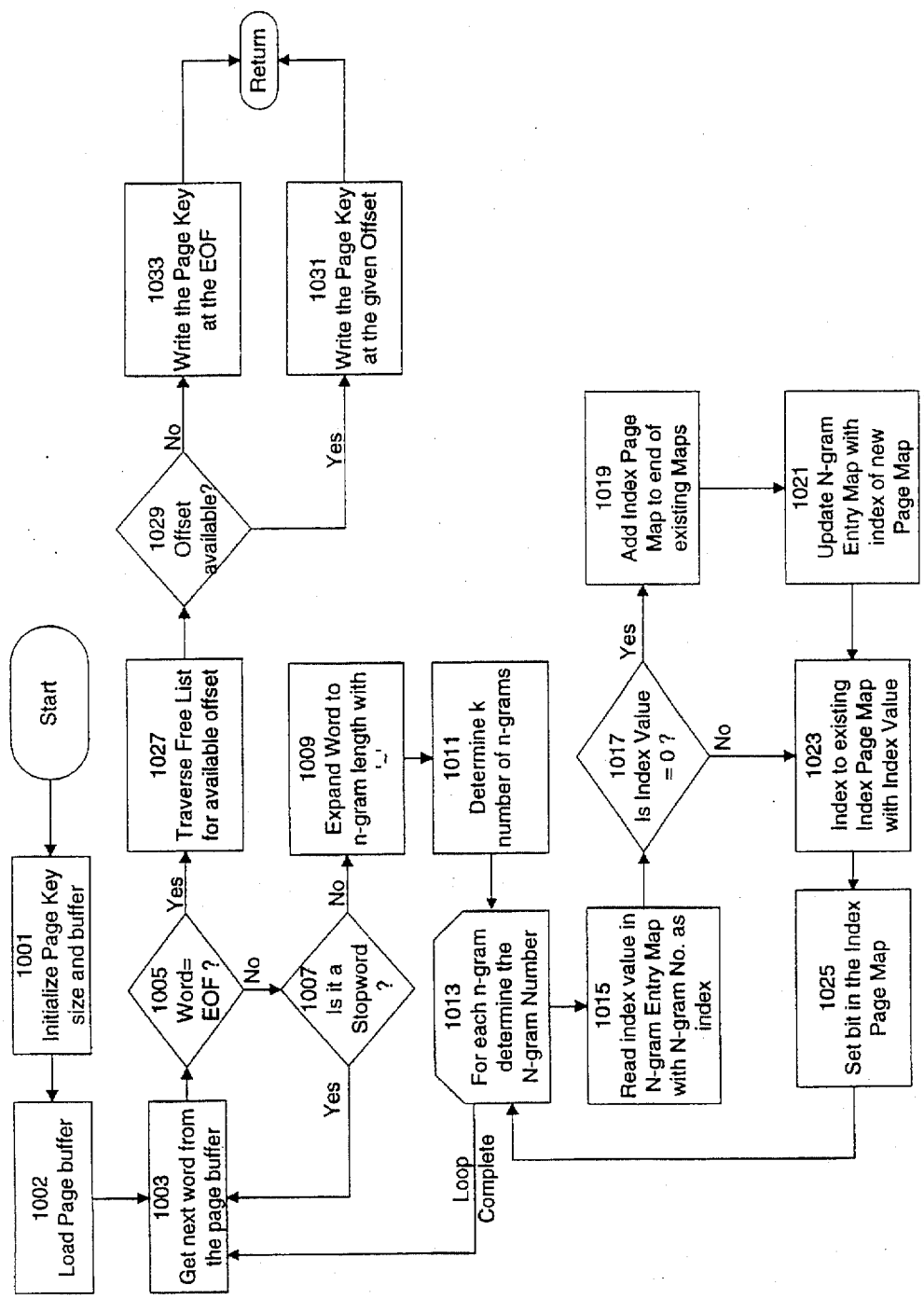
FIG. 10 is a flowgraph of the process of creating word keys in a page for storage in the bank index.

Referring now to FIG. 10 there is shown a flowgraph of the process of creating the word keys that constitute the page key 509 of a given page. The page key size 513 is initialized 1001 to zero, and the buffers 143, 145 are cleared. The index buffer 143 will be used to store the page key 509 as its being created. The page buffer 145 is used to hold the text data of the page. The page being indexed is loaded 1002 into the page buffer 145. The page indexing module 127 loops 1003 over all of the words on the page as stored in the page buffer 145. The page indexing module 127 determines 1005 whether the current word is an end-of-file. If the current word is not the end-of-file, then it checks 1007 whether the word is a stop word in the stop word file 135. This may be done by hashing or other conventional techniques. If the current word is a stop word, then the loop 1003 continues.

If the current word is not a stop word, then, the page indexing module 127 checks 1009 the length of the word, adding "~" to the word until its length equals the n-gram length. For example, in the preferred embodiment, two letter words are expanded with one "~" to make them three letters. Further it is preferred that one letter words are not expanded, because they contribute very little identifiable data for searching.

The page indexing module 127 then creates the word key for the word. This includes determining 1011 the number k of n-grams for the word. The number k of n-grams for the word key is (length of the word −2).

The word is then decomposed into its n-grams, and each n-gram is then read from the word, beginning with the first character, and reading the number of characters necessary to create the n-gram. For each n-gram the n-gram number is determined 1013. This may be done by looking up the n-gram number in the n-gram lookup table 227, or by calculating the n-gram number directly, as above.

In either case, the result of steps 1011 and 1013 will be the word key for the word, comprising the number k and the individual n-gram numbers for each of the n-grams in the word. The word key is appended to the buffer 143. The page key size 513 is updated 1014 to accumulate the size of the word key. The new page key size 513 is:

page key size=page key size+(1+k*sizeof(n-gram number)).

The sizeof function gets the number of bytes used to store the n-gram number. For trigrams, this is two bytes, but will be higher for larger n-grams. This is multiplied by k, the number of n-grams. An extra element is added for storing k.

For each n-gram number so generated and included in the word key, the n-gram entry map 505 and index page map 507 must be updated. The n-gram number is used as an index into the n-gram entry maps 505. The index value in the n-gram entry map 505 is obtained 1015 and checked 1017. If the index value is zero, it means that the n-gram has no previous reference in the bank 217 and a new index page map 507 is to be created. If the index value is non-zero it means that the n-gram has been previously found in a page in the bank 217, and there already exists a index page map 507 for the n-gram. The (index value −1) from the n-gram entry map 505 is then added to the index offset 501 to reach the correct index page map 507.

Accordingly, if the n-gram entry map 505 index value is zero, another index page map 507 is added 1019 at the end of the current set of index page maps 507. The index value of the n-gram entry map 505 referenced by the n-gram number is updated 1021 with the position of the new index page map 507 so that the latter can be directly accessed using the n-gram entry map 505 when another reference to the n-gram is created (during indexing) or identified (during searching). Thus, for the first n-gram of the first page to be included in a bank 217, that n-gram (whatever its n-gram number) will have an index number of 1 in the n-gram entry map 505, and the first index page map 507 will be associated with it. The next n-gram, again regardless of its n-gram number, or how "far" from the first n-gram, will have the index value 2 in its n-gram entry map 505, and will be allocated the second index page map 507.

If the index value in the n-gram entry map 505 is non-zero, the page indexing module 127 uses the (index value −1) to reach 1023 the index page map 507 for the n-gram.

The page indexing module 127 sets 1025 the (bank offset 411)$^{th}$ bit in the index page map 507 for the n-gram. This indicates that the (bank offset 411)$^{th}$ entry in the bank 217 has a reference to the n-gram. This is the page currently being indexed.

This update is repeated (1013) for each n-gram in the word key. The page indexing module 127 continues (1003) with the next available word in the page.

Once all word keys for the page are completed in loop 1003, the entire set of word keys for the page will constitute the complete page key 509. The page key size 513 will be the size of the entire page key 509, and will be present in the buffer 143. It now remains to store this page key 509 in an appropriate location in the page key table 517 of the bank index 223.

The page indexing module 127 traverses 1027 the free list 221 for the bank 217 to determine 1029 the page key offset 511 of the first available page key 509 with a page key size 513 greater than or equal to the page key size of the just completed page key. As stated above, the free list 221 maintains the offsets 511 for page keys 509 for pages that have been deleted, and thus have their space available for storing another page key 509 for another page.

If such a page key offset 511 is located, the newly created page key is written 1031 to the page key 509 entry in the page key table 517. If no interstitial entry of sufficient size is found, the page key is written 1033 after the last existing entry in the page key table 517. In either case, the page key offset 511, and the page key size 513 are updated.

Referring again to FIG. 9, the page indexing module 127 then unloads 923 the stop word file 135, and returns 925 control to the index executive module 121.

Referring again to FIG. 8, the index executive 121 updates 807 the DFS file 211 with the bank reference (bank number 409 & bank offset 411) of the indexed page, associating the bank reference with the particular image and text page for the indexed page. This allows the system 100 to retrieve the index information for the page during searching and when the image of the page is viewed and mapped to the text data for access by the user. Similarly, the index executive 121 updates 809 the DFS file 211 with the document number 301 from the document list 225, again, allowing the system 100 to retrieve the document. Finally, the index executive 121 frees up 811 the allocated memory resources. The index executive 121 then returns control to the application executive 119 to allow for additional indexing, transferring 705 of indices and documents, or searching 709.

III. Document Searching

Referring again to FIG. 7, the user may also search 709 any number of drawers for documents matching an input search query. Generally, searching involves decomposing each word in the search query into its n-grams, determining which document pages include which n-grams, and then performing any Boolean or other operations on the resulting matches. More particularly, each bank is searched to determine if any n-grams of the query words appear on any page in the bank. These pages are noted. Then for each page, the n-grams of the query words are compared against each n-gram in each word key in each page key on the page. This determines the preciseness of the match between the query words, and the words on each page.

Figure 11:
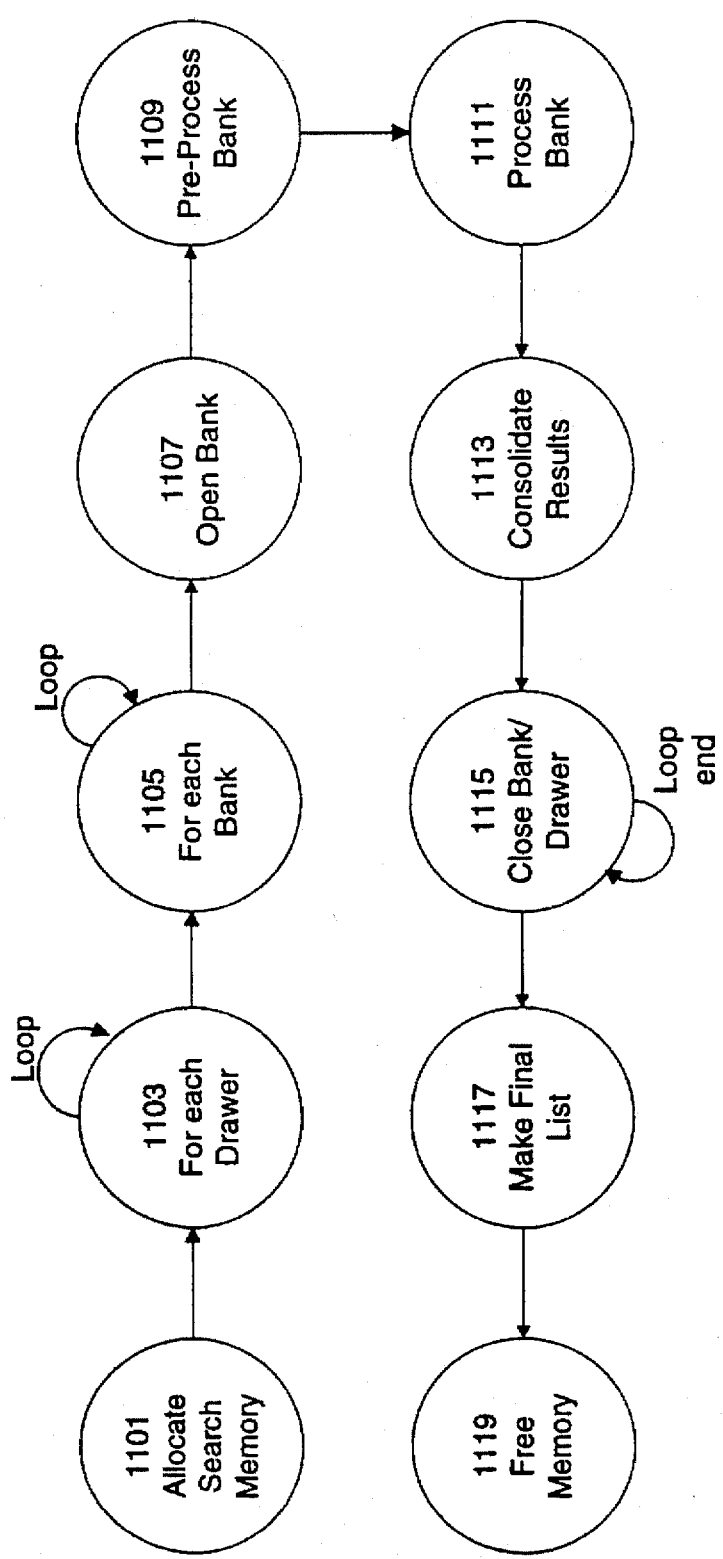
FIG. 11 is a flowgraph of the searching process.

Referring now to FIG. 11, there is shown a flowgraph of the process is 709 of searching the system 100 with an input search query, as managed by the search executive 123.

The search executive 123 begins by allocating 1101 sufficient memory resources for use during searching. This includes clearing the page buffer 145, and the search buffer 143. Typically, about 700 k is allocated for searching a drawer containing 16,000 documents. In addition, the search executive 123 initializes a results buffer that tracks for each bank, which page entry 413 (by bank offset 411) includes a hit for the query words.

The search executive 123 then initiates a loop 1103 over all drawers 201 selected for searching, and then a second loop 1105 for all banks 217 in each drawer 201.

Figure 12:
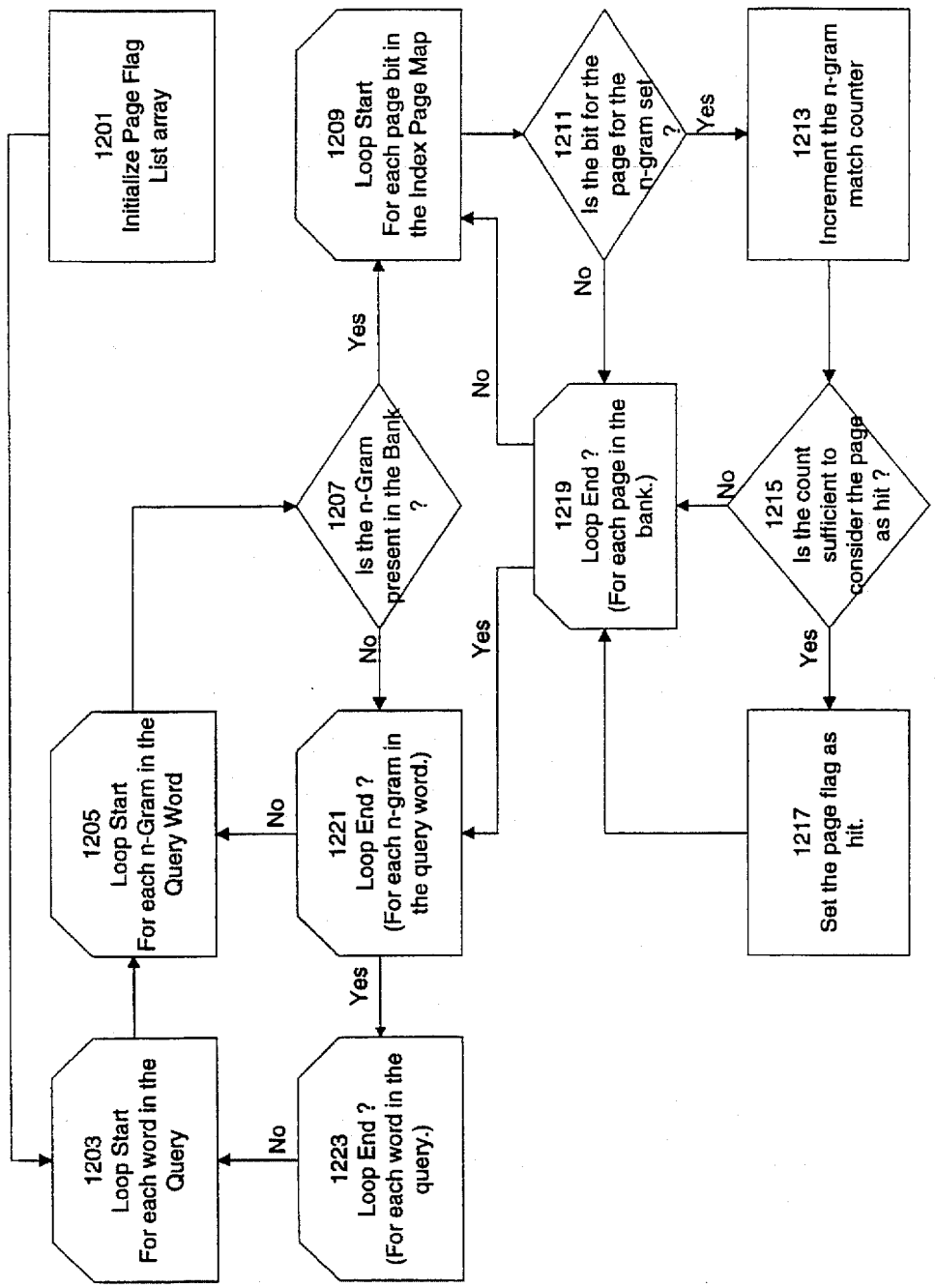
FIG. 12 is a flowgraph of the pre-processing operation on a bank.

The search executive 123 retrieves 1107 the bank index 223 for the current bank 217, and then invokes the search execution module 129 to perform a pre-processing 1109 operation. Pre-processing 1109 identifies those pages within the current bank 217 that match any n-grams in the search query words that satisfy the matching parameter. Pre-processing is thus an first filtering step that eliminates from further searching pages that do not contain any n-grams of the search words. FIG. 12 is a flowgraph of the pre-processing operation.

The search execution module 129 initializes a page flag list array, which tracks for each page in the bank 217 whether the page includes a hit on any n-gram of any query word, thereby qualifying the page for further processing. In the preferred embodiment, the page flag list array is a 1-D array, with an entry for each page in the bank 217, corresponding to its bank offset 411. That is, page flag list $[P_{max}]$, where $P_{max}$ is the maximum number of pages in the bank 217.

The search execution module 129 then initiates a loop 1203 over each word Q in the search query. The search execution module 129 also initializes 1204 an n-gram match counter array G. The n-gram match counter array G tracks for page, the number of times any n-gram of a query word is found on the page. That is, G[P] is the number of occurrences of an n-gram of any query word on page P of the bank 217. Another loop 1205 is begun over each n-gram in the current query word Q. The n-grams for the current query word Q are determined as described above during indexing.

The search execution module 129 determines 1207 whether the current n-gram of Q is present on any page in the bank 217, by taking the n-gram number of the n-gram and checking the index value of the n-gram entry map 505 for that n-gram number in the bank index 223. As described above, the n-gram entry map 505 indicates for a given n-gram number, and hence n-gram, whether there are any occurrences of the n-gram in the bank 217.

If the index value is zero, it means that there were no instances of that n-gram of query word Q on any of the pages for that bank 217. In this case, the loop 1205 continues.

If the index value is non-zero, it means that there is at least one occurrence of the n-gram of query word Q on some page in the bank 217, and the index value indicates the index to the index page map 507 that identifies the page(s) in the bank 217 with the occurrence. Accordingly, the search execution module 129 traverses to the index page map 507 (adding the (index value −1) to the index offset 501 for the bank index 223).

The search execution module 129 then loops 1209 over the index page map 507, reading each bit B in the page map. The search execution module 129 determines 1211 whether the bit for each page is set. If not, the loop 1209 continues.

If the bit it set, this indicates that the page includes the n-gram of the is query word Q somewhere in its text data. The search execution module 129 increments 1213 the n-gram match counter G[P]. This indicates that an n-gram of the query word Q appears on page P of the bank 217.

The search execution module 129 then tests 1215 whether the incremented count G[P] is sufficient to deem the page as containing a hit for the current query word Q. This test whether G[P] is equal or greater than the number of n-grams in the query word Q, as weighted by the matching parameter E input by the user. If the user desires an exact match between a query word Q and a word on a page, then every n-gram in the query word Q must be present in the page, and hence a bit must be set for the page in each index page map 507 for each of the n-grams of the query word Q. For example, if the query word is "doorknob", then there are six n-grams, and the same page bit must be set in the six index page maps 507 for the n-grams of "doorknob." If the user desires a less than exact match, a fewer (some percentage) of the index page maps 507 must be set. Accordingly, the test 1215 is:

$$G[P] \leq \frac{K_Q * E}{100}$$

where $K_Q$ is the number of n-grams in Q, and E is the matching parameter. E preferably is a value between a useful lower bound, such as 20 and 100.

If this test 1215 is satisfied, then the page flag list array is updated 1217 to show that this page includes a hit for the query word Q. That is, the page list array is set at [Q,B], where B is the index of the current page, as controlled by loop 1209. Processing then continues until loop 1209 is exhausted. Once all loops are completed, pre-processing 1109 (FIG. 11) is done.

Referring again to FIG. 11, pre-processing 1109 thus produces the page list array, which shows for each query word Q, which page in the bank 217 currently being processed has an instance of the query word. This does not indicate where on the page the match between the query word Q and some word occurs. Now each page in the bank 217 can be processed 1111 to further determine the exact matches between the query words and words on a page, and whether it satisfies any Boolean operators.

Figure 13:
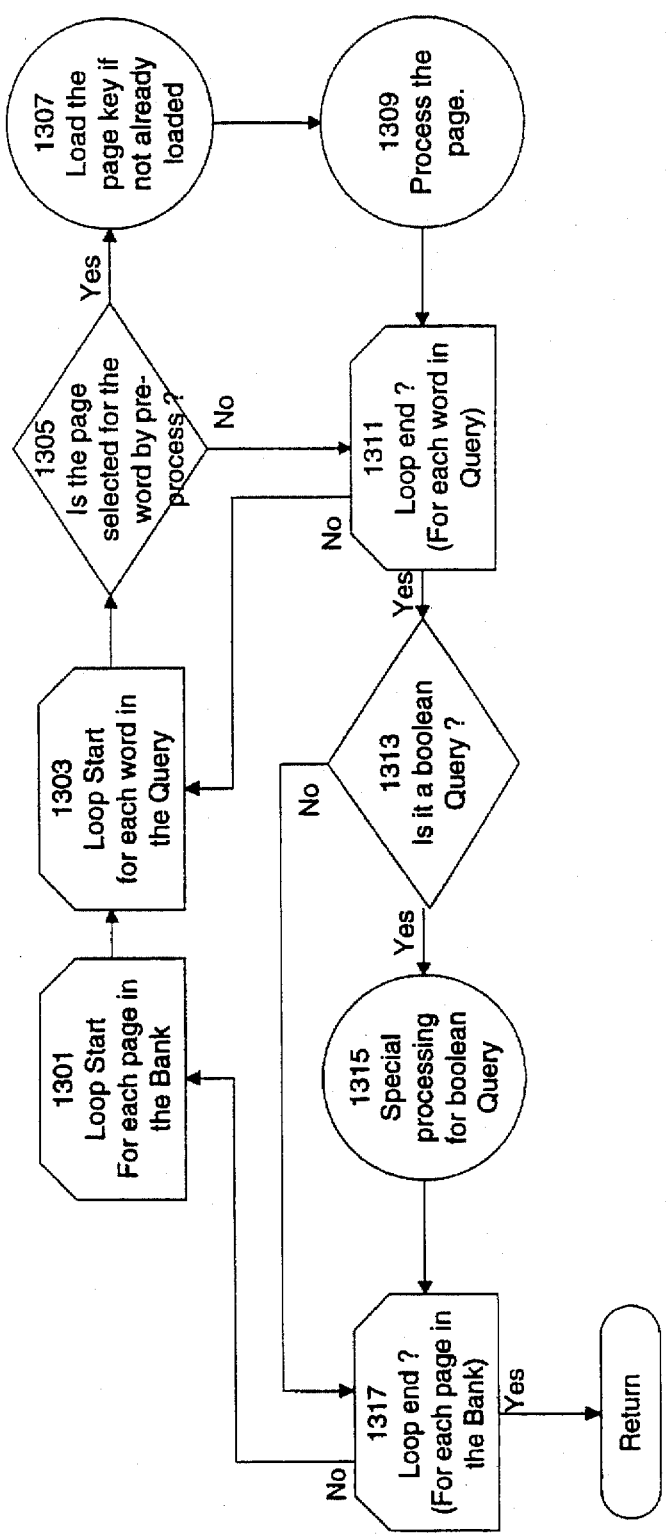
FIG. 13 is a flowgraph of the process of searching selected pages of a bank following pre-processing.

Referring now to FIG. 13, there is shown a flowgraph of the processing 1111 of a bank 217. In this phase, only those pages that were selected during preprocessing 1109 are further processed. The search execution module 129 initiates a loop 1301 over each page entrybank in the bank 217, iterating by the bank offset 411 values. A second loop 1303 is initiated over each word Q in the search query.

The search execution module 129 checks 1305 whether the page has an instance of the query word Q. This is preferably done by checking the page list array at [Q, bank offset 411]. This value will be set during pre-processing 1109 if there were any instances of the query word Q on the page, as determined in the index page map 507. If the page has not been so indicated, the loop 1303 continues.

Figure 14:
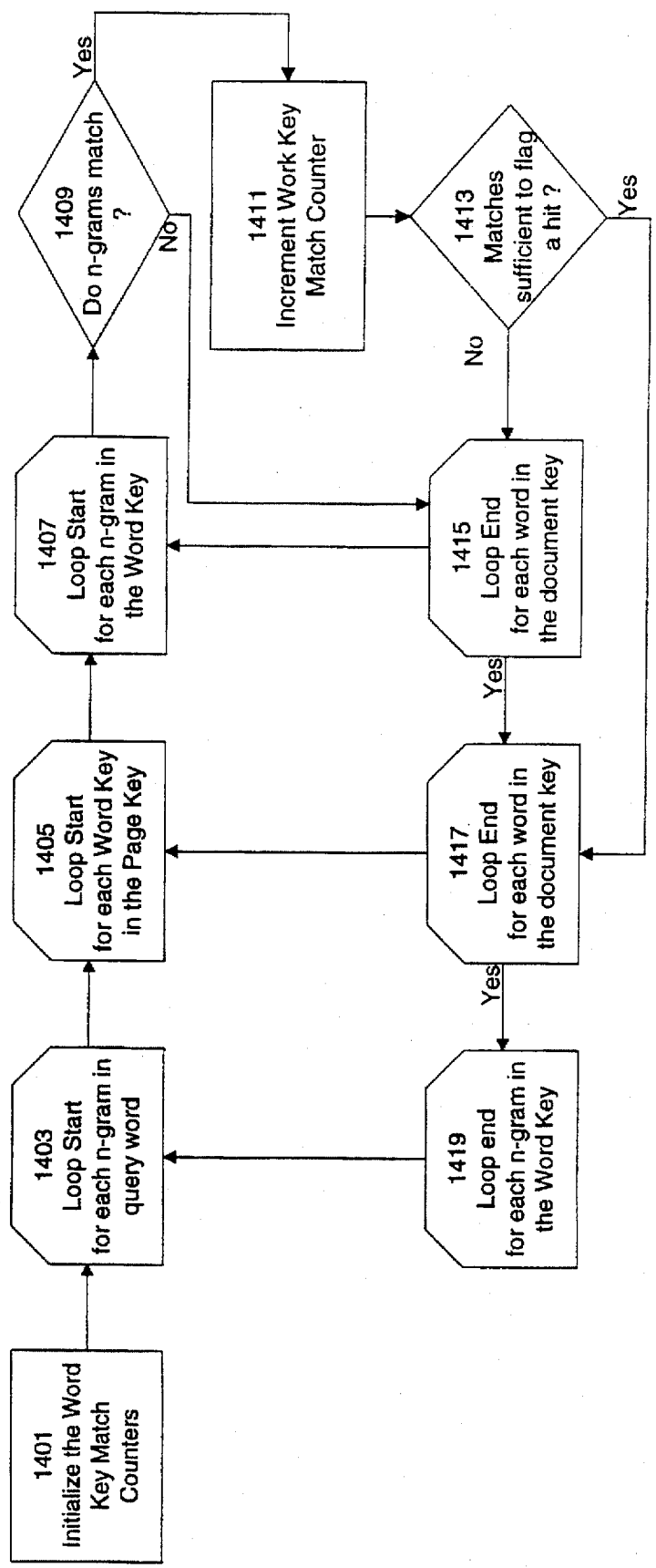
FIG. 14 is flowgraph of the process of matching n-grams of query words with n-grams of word on a page.

Otherwise, the page key 509 for the page is loaded 1307 into the page buffer 143. This is done by using the bank offset 411 to index into the page key offset table 515 and obtain the actual page key offset 511 to the correct page key 509. The page key 509 is then processed 1309 to determine how many of the n-grams on the page match the query words. FIG. 14 is flowgraph of this process 1309.

The search execution module 129 initializes a word key match counter for each work key W in the page key 509 with respect to each query word Q. This is preferably a 2D array $[Q_n, W_n]$ with $Q_n$ being the number of query words Q, and $W_n$ being the number of word keys W in the page key 509.

The search execution module 129 initiates a series of loops. An outer loop 1403 iterates over each n-gram in a current query word Q (which is controlled by the loop 1303, see FIG. 13). The n-grams are determined as above, along with the n-gram number which is actually used in the comparisons. A second loop 1405 iterates over each word key W in the page key 509 for the page. As described above, during indexing each word produces a word key with all of the n-grams for the word. This loop compares each word key (and hence each word) with each query word. A final loop 1407 iterates over each n-gram in a word key.

In the heart of these loops, the search execution module 129 compares 1409 the current n-gram of the query word Q with the current n-gram of the word key. If they are the same, then the word key match counter is incremented 1411 (hence increment word key match counter array[Q,W] for the current iterations of Q and W). What this means is that one n-gram for the query word Q matched one n-gram from a word in the page. The counter will track the number of these matches.

The search execution module 129 then determines 1413 whether there are enough matches (using the value of the word key match counter array[Q,W]) to indicate the match between the query word Q itself and the word itself. Again, this test is based on the matching parameter E. So, if an exact match is required (E=100), then every n-gram in the word key W must match every n-gram in the query word Q; that is:

word key match counter array [Q,W]=$K_Q$.

where $K_Q$ is the number of n-grams in query word Q. If an exact match is not required (E<100) then some percentage must match. Generally:

$$\text{word key match counter array } [Q,W] \leq \frac{K_Q * E}{100}$$

If this test is satisfied, then the search execution module 129 sets 1414 the results buffer for the bank and page entry 411 as indicating a hit for the search query. The inner loop 1407 need not be completed, since enough of the n-grams match.

The search execution module 129 then continues to exhaust loops 1405 and 1403, completing the above evaluation for each word in the word key W, and for each word key W in the current page key 509 (as controlled by loop 1301, see FIG. 13).

Referring again to FIG. 13, the current page entry 413 is processed 1309 for each query word Q. Once all query words have been analyzed, as described, the search execution module 129 determines 1313 whether the search query includes any Boolean operations. If a Boolean operation is required, the search execution module 129 performs the Boolean processing 1315. Boolean processing 1315 can be conventionally performed, since at this point the search execution module 129 has identified whether the query word Q is a hit for the current page. Only false conditions need be identified in the results buffer, since pages satisfying the Boolean query will be returned to the user. Boolean processing 1315 is generally as follows:

If the query word Q is an argument for an AND operation, and there is no instance of the query word Q on the page (as determined by the word key match counter) then mark the page as rejected.

If the query word Q is an argument for a NOT operation, and there is an instance of the query word Q on the page, then mark the page as rejected.

If any pair of query words $Q_1$, $Q_2$ are arguments for an XOR operation, and if only both or neither of them is found on the page, then mark the page as rejected.

If the query word Q is a phrase (sequence of words in quotes), and the is same sequence is not found, then mark the page as rejected.

After Boolean processing 1315, the search execution module 129 continues.

If Boolean processing 1315 is not required, the search execution module 129 continues to complete loop 1301, iterating to the next page entry 413 in the bank 217. When done, the search execution module 129 returns control to the search executive 123.

Referring again then to FIG. 11, the search executive 123 then invokes the search list module 131 to consolidate 1113 the results of the searching processes. Consolidation of the search results is used because the pages of a given document can reside in multiple banks 217. The search list module 131 reviews the results buffer, and identifies the bank 217 just processed. The page entry 413 by the bank 217 and bank offset 411 of each hit is determined and the search list module 131 accesses the document number 403 to obtain the document containing the page entry 413. From there, the DFS file 211 can be accessed, and the remaining pages of the document are accessed, and consolidated. The consolidated list of documents that match the search query is returned to the search executive 123.

The search executive 123 then completes 1115 the loops 1105, 1103 over each bank, and each drawer, closing the appropriate drawers, and banks. The results for all of the banks and drawers are similarly consolidated, and final list of documents matching the search query developed 1117, and displayed 711 (FIG. 7) to the user for evaluation. The search executive 123 then deallocates memory used during searching, and returns 1119 control to the application executive 119.

The n-gram decomposition method of the present invention has been described with respect to information and retrieval systems. However, many other uses of n-gram decomposition are within the scope of the present invention. N-gram decomposition may be used with other text processing methods or systems for improved performance therein. For example, n-gram decomposition could be used with a spell checker, either batch or interactive, to identify misspelled words, and provide a more accurate list of possible replacements for each. Likewise, n-grams can be used with computerized dictionaries or thesaures to identify word roots and look up the appropriate definition or synonyms, antonyms or the like. Also, n-grams may be used with grammer checkers in a similar fashion to identify words prior to grammatical analysis. These and other uses of n-gram decomposition to process text data are all within the scope of the present invention.

We claim:

1. A computer-implemented method for indexing stored documents, each document containing at least one page and containing a plurality of words, and searching for at least one document matching an input search query containing at least one query word, comprising the steps of:

for each document:
  identifying non-stop words on each page of the document;
  determining for each non-stop word at least one n-gram;
for each n-gram, storing a map having a plurality of positions, each position corresponding to a page, and each position indicating whether or not the corresponding page contains the n-gram;
determining at least one query word n-gram for the at least one query word; and
is retrieving documents having n-grams that match selected ones of the query word n-grams, by performing the steps of:
  determining a map corresponding to the query word n-gram;
  determining from the map at least one page containing the query word n-gram; and
  retrieving the page, and the document associated therewith.

2. A computer readable memory including a storage structure for indexing documents by n-grams, each document having a document number, and a document name, and at least one page, each page having a page number, comprising:

a bank comprising a list of page entries, each page entry identifying a page by the document number of the document containing the page, and a page number within the document; and, a bank index associated with the bank comprising:
  i) a plurality of n-gram entry maps, each n-gram entry map associated with a single n-gram, selected n-gram entry maps having an index to an index entry map where at least one page identified in the bank includes the n-gram associated with the n-gram entry map;
  ii) a plurality of index entry maps, each index entry map indexed by one of the n-gram entry maps, each index entry map having a plurality of positions, each position corresponding to a page entry in the bank, and each position indicating whether or not the corresponding page entry in the bank identifies a page containing the n-gram associated with the n-gram entry map that indexes the index entry map.

3. The computer readable memory of claim 2, wherein:
a) each page entry in the bank has an offset;
b) each index entry map includes a plurality of bit positions, each bit position associated with a page entry in the bank, each bit position having a first value where the page identified in the page entry associated with the bit position includes the n-gram associated with the n-gram entry map that indexes the index entry map, and a second value where the page identified in the page entry associated with the bit position does not include the n-gram associated with the n-gram entry map that indexes the index entry map.

4. The computer readable memory of claim 2, further comprising:
a) a drawer including:
i) a list of documents, each document uniquely identified in the list;
ii) a plurality of banks, and associated bank indices; and
iii) a bank list including for each of the plurality of banks a count of a number of empty page entries in the bank.

5. The computer readable memory of claim 2, wherein each bank further comprises:
a) a page key table including at least one page key, each page key uniquely associated with a page entry in the bank, and comprising:
b) for each word on the page, a list of the n-grams in the word.

6. A computer implemented method of retrieving a document, comprising:
a) storing the storage structure of claim 2 on a computer readable memory;
b) receiving a query term;
c) for each of a number of n-grams in the query term:
i) determining from the n-gram map in the bank index associated with the n-gram of the query term whether an index entry map exists for the n-gram;
ii) responsive to an existing index entry map, determining from the index entry map each page entry in the bank that identifies a page containing the n-gram associated with the index entry map; and
iii) incrementing for each page that contains the n-gram an n-gram counter;
d) for each page in the bank, determining whether the n-gram counter for the page is sufficiently similar to the number of n-grams in the query term to indicate that the page contains the query term; and
e) responsive to the n-gram counter for a page being sufficiently similar to the number of n-grams in the query term, retrieving the document containing the page for subsequent query analysis.

7. The computer implemented method of claim 6, wherein the n-gram counter for the page is sufficiently similar to the number of n-grams in the query term where:

$$G[P] \leq \frac{K * E}{100}$$

wherein
P is the page;
G is the n-gram match counter for page P;
K is the number of n-grams in the query term; and
E is a matching parameter selected to control the percentage of matches between the n-gram match counter and K.

8. A computer implemented method of indexing a plurality of documents, each document having at least one page, each page having less than a maximum amount of data, and having a plurality of words, comprising:
a) storing a list of pages, each page associated with a document;
b) determining a list of n-grams; and
c) for selected ones of the n-grams, storing a map of pages that contain the n-gram by:
i) retrieving a current page from the documents; and
ii) for each non-stop word of the current page:
1) determining the n-grams in the word; and
2) for each n-gram in the word:
in a map associated with the n-gram and having a plurality of positions, each position corresponding to a page, and each position indicating whether or not the corresponding page contains the n-gram, updating the position for the current page as indicating that the page contains the n-gram.

9. The computer implemented method of claim 8, for additionally retrieving a document including a query term, comprising:
d) receiving a query term;
e) for each of a number of n-grams in the query term:
i) determining whether a map exists for the n-gram;
ii) responsive to an existing map, determining from the map each page in the list that contains the n-gram associated with the map; and
iii) for each page in the list, determining whether the page contains a sufficient number of n-grams in the query term to indicate that the page contains the query term; and
f) responsive to each page containing the query term, retrieving the document containing the page for subsequent query analysis.

10. A computer readable memory including thereon a computer program configuring and controlling a processor to perform the steps of claim 8.

11. A computer readable memory for controlling a processor to index a plurality of documents, each document containing at least one page comprising:
a list of indexed pages;
a set of index maps, each index map associated with one n-gram and having a plurality of positions, each position uniquely associated with a page in the list of indexed pages, and each position indicating whether or not the corresponding page includes the n-gram associated with the index map; and
a page indexing module that:
i) receives a current page to be indexed;
ii) creates an entry for the current page in the list of indexed pages;
iii) stores for each non-stop word of the current page a list of n-grams in the word; and
iv) for each n-gram, updates in the index map associated with the n-gram, the entry for the current page to indicate that the current page includes the n-gram.

12. The computer readable memory of claim 11, wherein the page indexing module stores for a non-stop word of the current page a list of n-grams in the word by:
iii.1) determining an n-gram number for each n-gram in the word;
iii.2) storing the n-gram number of each n-gram in the word; and
iii.3) associating the stored n-gram numbers with the current page.

13. A computer readable memory for controlling a processor to index a plurality of documents, each document containing at least one page, the memory comprising:

a list of indexed pages;

a set of index maps, each index map associated with one n-gram and having a plurality of positions, each position uniquely associated with a page in the list of indexed pages, and each position indicating whether or not the corresponding page includes the n-gram associated with the index map; and a page indexing module that:
  i) receives a current page to be indexed;
  ii) creates an entry for the current page in the list of indexed pages;
  iii) stores for each non-stop word of the current page a list of n-grams in the word by:
    iii.1) determining an n-gram number for each n-gram in the word by the equation:

$$NG = \sum_{i=1}^{N_p} x_i * C_{max}^{N_p-i}$$

where NG is the n-gram number of the word;

x is an n-gram character number of the $i^{th}$ character of the word;

$C_{max}$ is total number of indexable characters; and $N_p$ is the desired number of letters in the n-gram;

iii.2) storing the n-gram number of each n-gram in the word; and
  iii.3) associating the stored n-grams numbers with the current page; and
  iv) for each n-gram, updates in the index map associated with the n-gram, the entry for the current page to indicate that the current page includes the n-gram.

14. A computer readable memory for controlling a processor to index a document including a query term from a plurality of documents, each document containing at least one page, comprising:

a list of indexed pages, each page associated with a document;

a set of index maps, each index map associated with one n-gram and having a plurality of positions, each position uniquely associated with a page in the list of indexed pages, and each position indicating whether or not the corresponding page includes the n-gram associated with the index map; and a search module that: receives a query term;

for each of a number of n-grams in the query term:
  determines whether there is an index map associated with the n-gram; and
  responsive to an existing index map,
    determines from the index map each page in the list of indexed pages that contains the n-gram associated with the map;

for each page in the list of indexed pages, determines whether the page contains a sufficient number of the n-grams in the query term to indicate that the page contains the query term; and responsive to a page containing the query term, retrieves the document containing the page for subsequent query analysis.

15. The computer readable memory of claim 14, wherein the search module determines whether a page contains a sufficient number of the n-gram in the query term by the equation:

$$G[P] \leq \frac{K * E}{100}$$

wherein:

P is the page;

G is the number of n-grams in the query term contained in page P;

K is the number of n-grams in the query term; and

E is a matching parameter selected to control the percentage of matches between the number of n-grams in the query term that are contained in the page P, and K.

* * * * *